(12) United States Patent
Umemori

(10) Patent No.: US 10,903,699 B2
(45) Date of Patent: Jan. 26, 2021

(54) CROSS-COUPLED COMPOSITE MOTOR, CROSS-COUPLED COMPOSITE POWER GENERATOR, AND CROSS-COUPLED COMPOSITE LINEAR MOTOR

(71) Applicant: CCU LINEAR MOTOR LABORATORY LTD., Kamakura (JP)

(72) Inventor: Takashi Umemori, Kamakura (JP)

(73) Assignee: CCU LINEAR MOTOR LABORATORY LTD., Kamakura (JP)

(*) Notice: Subject to any disclaimer, the term of this patent is extended or adjusted under 35 U.S.C. 154(b) by 397 days.

(21) Appl. No.: 16/068,490

(22) PCT Filed: Jan. 13, 2017

(86) PCT No.: PCT/JP2017/001116
§ 371 (c)(1),
(2) Date: Jul. 6, 2018

(87) PCT Pub. No.: WO2017/122814
PCT Pub. Date: Jul. 20, 2017

(65) Prior Publication Data
US 2019/0020227 A1    Jan. 17, 2019

(30) Foreign Application Priority Data
Jan. 15, 2016 (JP) ................. 2016-017506

(51) Int. Cl.
*H02K 1/14* (2006.01)
*H02K 19/10* (2006.01)
(Continued)

(52) U.S. Cl.
CPC ............. *H02K 1/14* (2013.01); *B60T 7/22* (2013.01); *B60T 8/17* (2013.01); *H02K 1/16* (2013.01);
(Continued)

(58) Field of Classification Search
CPC .......... H02K 1/14; H02K 11/21; H02K 11/30; H02K 1/16; H02K 1/246; H02K 3/20;
(Continued)

(56) References Cited

U.S. PATENT DOCUMENTS 5,334,899 A * 8/1994 Skybyk ............... H02K 1/2793
310/114
2012/0080977 A1    4/2012 Kusase
(Continued)

FOREIGN PATENT DOCUMENTS

| JP | 2011-125125 | 6/2011 |
|---|---|---|
| JP | 2012-080692 | 4/2012 |

OTHER PUBLICATIONS

International Search Report for PCT/JP2017/001116, dated Apr. 11, 2017, 3 pages.
(Continued)

*Primary Examiner* — Thienvu V Tran
*Assistant Examiner* — Bart Iliya
(74) *Attorney, Agent, or Firm* — Nixon & Vanderhye P.C.

(57) ABSTRACT

Provided is a motor system adapted for modern society, which does not use a rare-earth magnet, improves a torque weight ratio by approximately one digit in comparison with the conventional motor, and has transfer efficiency of 90% between electric energy and rotational energy. A stator (1) has a dual-ring tooth-groove iron core, which has magnetic pole surface on both side surfaces and receives coils of basically two-phase structure divided to be multiplexed, with divided coils being interconnected. A rotor (2) is formed to be capable of rotating while holding eight sets of attraction poles having magnetic pole surfaces on both ends, with each set of attraction poles forming four air-gap-facing surfaces by positioning the dual-ring tooth-groove iron core between the attraction poles so that both side surfaces of the
(Continued)

dual-ring tooth-groove iron core face the attraction poles via an air gap (6). Magnetic energy accompanying coil switching can be reduced to one part per dozens through the dual effect of reduction owing to coil division and dispersion owing to interconnection. The torque weight ratio can be improved approximately by one digit through synergistic effect of torque increase owing to integration of magnetomotive forces by interconnection, torque increase owing to composite structure of the attraction poles, and weight reduction of the iron core.

4 Claims, 16 Drawing Sheets

(51) Int. Cl.

| | |
|---|---|
| *H02K 3/28* | (2006.01) |
| *H02K 11/30* | (2016.01) |
| *H02K 1/24* | (2006.01) |
| *H02K 17/02* | (2006.01) |
| *H02K 16/02* | (2006.01) |
| *H02K 1/16* | (2006.01) |
| *B60T 8/17* | (2006.01) |
| *B60T 7/22* | (2006.01) |
| *H02K 11/21* | (2016.01) |
| *H02K 3/20* | (2006.01) |
| *H02K 7/102* | (2006.01) |
| *H02K 17/18* | (2006.01) |
| *H02K 17/42* | (2006.01) |
| *H02K 41/025* | (2006.01) |
| *B60K 7/00* | (2006.01) |
| *B60L 7/10* | (2006.01) |
| *B60T 1/06* | (2006.01) |

(52) U.S. Cl.
CPC .............. *H02K 1/246* (2013.01); *H02K 3/20* (2013.01); *H02K 3/28* (2013.01); *H02K 7/102* (2013.01); *H02K 11/21* (2016.01); *H02K 11/30* (2016.01); *H02K 16/02* (2013.01); *H02K 17/02* (2013.01); *H02K 17/185* (2013.01); *H02K 17/42* (2013.01); *H02K 19/10* (2013.01); *H02K 19/103* (2013.01); *H02K 41/025* (2013.01); *B60K 7/0007* (2013.01); *B60K 2007/0092* (2013.01); *B60L 7/10* (2013.01); *B60T 1/065* (2013.01); *B60T 2201/022* (2013.01); *Y02T 10/64* (2013.01)

(58) Field of Classification Search
CPC .......... H02K 3/28; H02K 7/102; H02K 16/02; H02K 17/02; H02K 17/185; H02K 17/42; H02K 19/10; H02K 19/103; H02K 41/025
See application file for complete search history.

(56) References Cited

U.S. PATENT DOCUMENTS

2013/0342040 A1* 12/2013 Umemori .............. H02P 25/092
310/49.43
2016/0352203 A1* 12/2016 Kusase .................. H02K 1/246
2019/0052133 A1* 2/2019 Piskorz .................. H02K 1/182

OTHER PUBLICATIONS

T. Umemori et al., Development of DC Linear Motor, IEEE Transactions of Power Apparatus and Systems, vol. PAS-98, No. 4, Jul./Aug 1979, p. 1456-1465.
T. Umemori, Construction and Characteristics of Linear Thyristor Motors, Electrical Engineering in Japan, vol. 98, No. 1, 1978, pp. 28-36 (Translated from Denki Gakkai Ronbunshi, vol. 98B, No. 1, Jan. 1978, pp. 9-16).

* cited by examiner

[A]

[B]

[A]

[B]

[A]

[B]

[A]

[B]

[A]

[B]

[A]

[B]

[A]

[B]

[C]

[D]

[A]

[B]

[Commutation from A-phase to B-phase]

[A] A-phase continuity

[B] Commutating

[C] Commutating

[D] Finish of Commutation

[Commutation from B-phase to A-phase]

[E] B-phase continuity

[F] Commutating

[G] Commutating

[H] Finish of Commutation

[A]

[B]

[C]

CROSS-COUPLED COMPOSITE MOTOR, CROSS-COUPLED COMPOSITE POWER GENERATOR, AND CROSS-COUPLED COMPOSITE LINEAR MOTOR

This application is the U.S. national phase of International Application No. PCT/JP2017/001116 filed 13 Jan. 2017, which designated the U.S. and claims priority to JP Patent Application No. 2016-017506 filed 15 Jan. 2016, the entire contents of each of which are hereby incorporated by reference.

TECHNICAL FIELD

The present invention relates to an innovative attraction motor, which improves the torque weight ratio approximately by one digit by combining a dual-ring tooth-groove iron core having magnetic pole surfaces on both sides, coils that are overlappingly wound to be intercoupled, and attraction poles each having opposed surfaces at both ends.

BACKGROUND ART

In the fourth decade (1965-1974) of the Showa period, a variable voltage variable frequency three-phase pseudo sine wave inverter was invented using pulse width modulation technique. And a motor system that can perform speed control in a wide range was invented by combining this inverter with a three-phase synchronous motor or a three-phase induction motor, and has been used widely since then and up to the present.

However, in recent years, the social environment has changed largely toward increase of energy value, increase of resource value, reduction of $CO_2$, and reduction of air pollution. Further, the situation arises in which fossil fuel vehicles are going to be replaced by electric vehicles and fuel cell vehicles in a short period of time for protection of the global environment. Thus, the motors as we know them today are obliged to change largely.

CITATION LIST

Patent Literature

Patent Literature 1: Japanese Unexamined Patent Application Laid-Open No. 2011-125125

Non-Patent Literature

Non-patent Literature 1: T. Umemori, Development of DC Linear Motor, IEEE Trans PAS, -98, No. 4, July/August, 1979, p. 1458
Non-patent Literature 2: Takashi Umemori, Development of Linear Thyristor Motor and Application to Railway System, IEEJ Transactions on Power and Energy, 98, January 1978, p. 10

SUMMARY OF INVENTION

Technical Problem

The conventional technique has following problems to be solved.
i) Realization of low speed large torque gearless motor. To this end, it is necessary to improve the torque weight ratio of a motor approximately by one digit in comparison with the conventional motor.
ii) Highly-efficient reversibility of electrical energy and rotational energy. This can lead to recycling of braking energy.
iii) Freeness from resources. Neodymium magnet and copper coil are not used. Additionally, it is necessary to employ structure that allows mass production.

The present invention has been made to solve the above problems.

Solution to Problem

The present invention provides not improvement of the conventional motor but an innovative motor that is realized by introducing a plurality of new visions based on an attraction-force type motor. The motor of the present invention is an interconnection-composite-type motor, comprising:

a stator, in which a rectangular-cross-section dual-ring tooth-groove iron core has tooth iron cores, which each penetrate to both side surfaces and are finished on both side surfaces, and grooves for receiving coils wound on both the side surfaces, with the tooth iron cores and the grooves being arranged alternately in circumferential direction; and the dual-ring tooth-groove iron core receives and mechanistically holds coils of a first overlapping phase, coils of a second overlapping phase, coils of a third overlapping phase, coils of a fourth overlapping phase, . . . in such a way that A-phase coils and B-phase coils of the first overlapping phase in commutating relation to each other alternately at intervals of one magnetic pole length with the coils of the same phase being connected in series, the coils of the second overlapping phase in a same arrangement as the coils of the first overlapping phase are shifted as a whole by the one magnetic pole length divided by a number of overlapping phases, the coils of the third overlapping phase, the coils of the fourth overlapping phase, . . . are shifted sequentially and progressively in such a way that the coils of the predetermined number of overlapping phases overlap each other and are interconnected so that coils' magnetomotive forces are unified in direction in one ring-shaped tooth-groove iron core and coils' magnetomotive forces are unified in reverse direction in the other ring-shaped tooth-groove iron core;

a rotor, in which: composite structures are provided at intervals of two magnetic pole length in the circumferential direction of the ring-shaped tooth-groove iron cores, with each composite structure being formed so that attraction poles each having, at both ends, opposed surfaces of the one magnetic pole length in width are opposed on both sides at a same angular position to form a circulation magnetic path that connects large and small ring-shaped tooth-groove iron cores via an air gap and to form air-gap surfaces at four places; and the attraction poles as a whole are mechanistically held so that the rotor can rotate around the stator;

a two-quadrant constant current control circuit, which by itself performs control so as to output, in a constant direction, constant direct current of a value set with respect to load electromotive force that changes variously in a two-quadrant area for input from an alternating current; and a flip-flop circuit, in which overlapping circuits of the predetermined number of overlapping phases are connected in series in such a way that a flip-flop switch of a first overlapping circuit routes a supply current from the two-quadrant constant current control circuit alternately to either one of an A-phase coil and a B-phase coil of the stator depending on a signal from an angular position detector, and the routed circuit is converged again to supply the current to a flip-flop switch of a second overlapping circuit, and this is repeated for a third overlapping circuit, a fourth overlapping circuit, . . . to the number of the overlapping phases.

Further, the present invention provides an interconnection-composite-type motor, comprising:

a stator, which comprises a plurality of ring-shaped tooth-groove iron cores that are provided with magnetic poles on both surfaces or one surface and receive coils parallel to magnetic pole surfaces or surface, with the coils being multiplexed based on A-phase coils and B-phase coils as commutation partners so as to divide a coil ampere-turn in such a way that coils overlapping each other are shifted in phase angle by $\pi$/(number of overlapping phases), the overlapping parts are interconnected, and magnetomotive forces are unified in direction so that magnetic flux circulates in one direction; and a rotor, which holds attraction poles as a whole in such a way that composite mechanisms are provided at intervals of two magnetic pole length in a rotating direction, with each composite mechanism having attraction poles each having opposed surfaces of one magnetic pole length at both ends or on both surfaces, which are opposed to the ring-shaped tooth-groove iron cores via an air gap so that a magnetic path circulating at right angle to the rotating direction is formed and a plurality of air-gap surfaces are formed;

wherein the interconnection-composite-type motor utilizes an attraction force in the rotating direction or in the reverse direction or electric power recovered by a two-quadrant constant current control circuit, with the attraction force being generated in the attraction poles by positioning a leading edge or a trailing edge of each attraction pole at a position on which magnetomotive force of each overlapping coil concentrates by supplying constant current from the two-quadrant constant current control circuit to each overlapping coil at a phase difference of $\pi$/(number of overlapping phases) in turn while switching the constant current from the two-quadrant constant current control circuit to the A-phase coils or to the B-phase coils. Here, the motor of the present invention can be applied as an interconnection-composite-type linear motor, in which the above-described stator is made linear.

Further, the present invention provides a generator, comprising:

a stator, which comprises a plurality of ring-shaped tooth-groove iron cores that are provided with magnetic poles on both surfaces or one surface and receive coils parallel to magnetic pole surfaces or surface, with the coils being multiplexed based on two-phase coils made up of A-phase coils and B-phase coils as commutation partners so as to divide a coil ampere-turn in such a way that coils overlapping each other are shifted in phase angle by $\pi$/(number of overlapping phases), the overlapping parts are interconnected, and magnetomotive forces in each iron core are unified in direction so that magnetic flux circulates in one direction; and a rotor, which holds attraction poles as a whole in such a way that composite mechanisms are provided at intervals of two magnetic pole length in a rotating direction, with each composite mechanism having attraction poles each having opposed surfaces of one magnetic pole length at both ends or on both surfaces, which are opposed to the ring-shaped tooth-groove iron cores via an air gap so that a magnetic path circulating at right angle to the rotating direction is formed and a plurality of air-gap surfaces are formed;

wherein the generator utilizes an attraction force in the rotating direction or in the reverse direction or electric power recovered by a two-quadrant constant current control circuit, with the attraction force being generated in the attraction poles by positioning a leading edge or a trailing edge of each attraction pole at a position on which magnetomotive force of each overlapping coil concentrates by supplying constant current from the two-quadrant constant current control circuit to each overlapping coil at a phase difference of $\pi$/(number of overlapping phases) in turn while switching the constant current from the two-quadrant constant current control circuit to the A-phase coils or to the B-phase coils.

Advantageous Effects of Invention

It is considered that attraction force between an electromagnet excited near to the saturated magnetic flux and an iron piece is electromagnetically, by nature, substantially larger than the Fleming's force by a magnet and current in consideration of armature reaction. Nevertheless, power motors utilizing attraction force are not widely used. It is considered that it is because of difficulty of high-speed ON-OFF of current in a large-size electromagnet excited to the saturated magnetic flux of the iron core and non-existence of effectual technique of recovering with high efficiency residual magnetic energy equivalent to amount of work after the process of attraction process.

The present invention solves these problems, and has accomplished innovation of large torque increase and large reduction in weight. In addition to the premise of non-use of a rare-earth magnet, the advantageous effects of the present invention are as follows.

(A) The value of transferred magnetic energy accompanying switching of flip-flop switches (hereinafter, referred to as FF switches as abbreviation) 20 is reduced approximately to one part per dozens through the dual effect of distribution to each phase owing to coil division and interconnection, and overvoltage accompanying switching can be largely reduced.

(B) The magnetic energy is recovered by a two-quadrant constant current control circuit with high efficiency. Brake energy is also recovered similarly.

(C) Interconnected coil structure can largely increase effective attraction force by competition of interconnection inductances.

(D) Combination of ring-shaped tooth-groove iron core having magnetic poles on both surfaces and attraction pole having magnetic poles at both ends or on both surfaces increases opposed magnetic pole area by minimum iron core. Combination of (D) and (D) can attain large increase of the torque weight ratio approximately by one digit.

BRIEF DESCRIPTION OF DRAWINGS

FIG. 2[A] a B-B' cross-section, and FIG. 2[B] an A-A' cross-section;

FIG. 3[A] groove structure of an iron core supporter, and FIG. 3[B] groove structure of mold structure;

FIG. 4[A] illustrates the coil structure, and FIG. 4[B] circulation of magnetic flux;

FIG. 13[A] a basic circuit, and FIG. 13[B] current waveforms;

DESCRIPTION OF EMBODIMENTS

As a first embodiment of the present invention, a gearless in-wheel motor having 16-pole 6-overlapping-phase 4-surface structure will be described.

Figure 1:
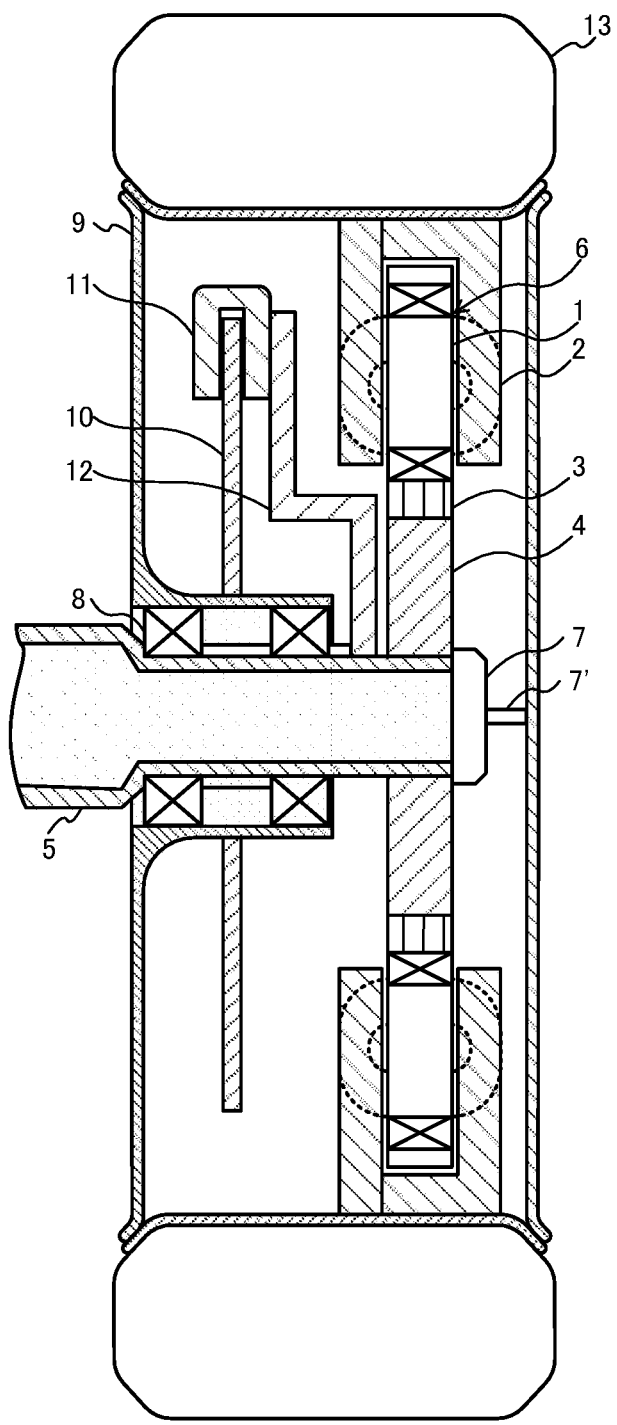
FIG. 1 is a cross-section view for explaining structure of an in-wheel motor system in which a gearless in-wheel motor according to a first embodiment of the present invention is provided within a wheel of a tire.

FIG. 1 illustrates a cross-section structure of an in-wheel motor system in which an in-wheel motor according to the present embodiment is provided within a wheel of a tire.

In FIG. 1, the reference numeral 1 denotes a stator, 2 a rotor, 3 an air-cooling duct, 4 a lightweight reinforcing member, 5 a support shaft, 6 an air gap, 7 an angular position detector, 8 a conical bearing, 9 a wheel, 10 a brake disk, 11 a brake shoe, 12 a mounting plate, and 13 a tire.

The stator 1 is formed in the shape of a disk by winding a coil around the below-described large and small ring-shaped tooth-groove iron cores and by reinforcing both members and the outer surfaces with the lightweight member 4, and is firmly fixed to the support shaft 5.

By the conical bearing 8, the wheel 9 is allowed to rotate about the support shaft 5 with movement in the axial direction suppressed.

The rotor 2 is formed in a ring shape whose cross-section is U-shaped so as to enclose the outer periphery of the stator 1 via the air gap 6, and is fixed to the wheel 9. That is to say, the stator 1 is fixed to the support shaft 5, whereas the rotor 2 is supported by the wheel 9 and thereby allowed to rotate around the stator 1 while keeping the air gap 6. Further, angular position information of the wheel 9 can be detected by the angular position detector 7. The brake disk 10 is mounted on the wheel 9, and rotates with the wheel 9. The brake shoe 11 is for giving a braking action to the brake disk 10, and is fixed to the support shaft 5 by the mounting plate 12. Accordingly, when the brake shoe 11 operates, braking force is applied to the tire 13.

Figure 2:
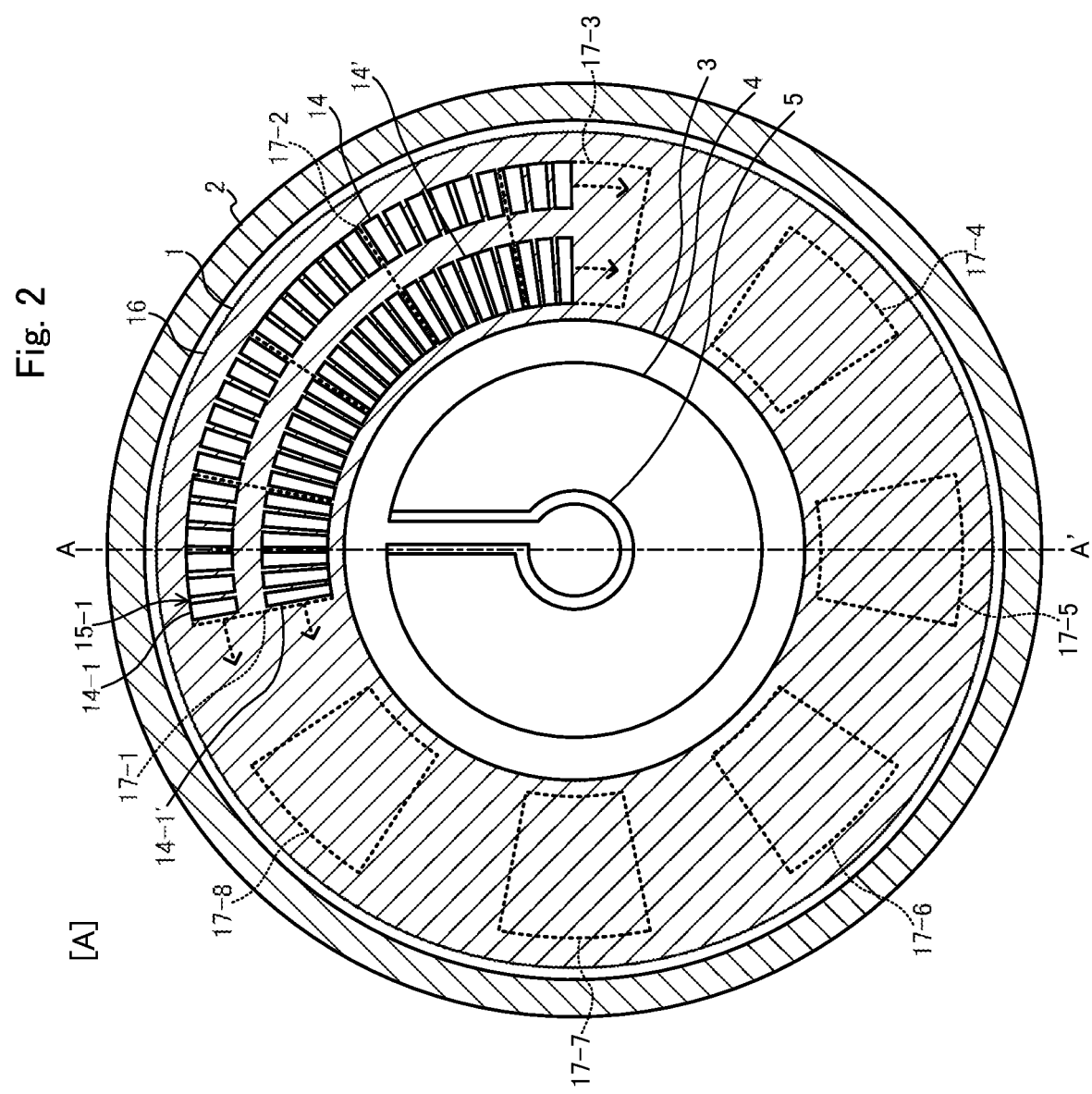
FIG. 2 illustrates cross-sections of the gearless in-wheel motor illustrated in FIG. 1.

FIG. 2 includes cross-section views of the gearless in-wheel motor illustrated in FIG. 1. FIG. 2[A] is a B-B' cross-section view, and FIG. 2[B] an A-A' cross-section view. In FIG. 2, the reference numeral 14 denotes a large ring-shaped tooth-groove iron core, 14' a small ring-shaped tooth-groove core, 14-1-14-K, 14-1'-14-K' (K: a natural number larger than 1, the same applies in the following) tooth iron cores, 15-1-15-K, 15-1'-15-K' grooves, 16 coils, and 17-1-17-8, 17-1'-17-8' attraction poles.

The stator 1 is formed by laying the large ring-shaped tooth-groove core 14 and the small ring-shaped tooth-groove core 14' both made of the same thickness ferromagnetic steel plates concentrically in the same plane, by winding the below-described coils 16 around the ring-shaped tooth-groove iron cores 14 and 14', and further by reinforcing them with the non-magnetic lightweight member 4. The ring-shaped tooth-groove iron cores 14 and 14' are arranged to be spaced therebetween, considering effects of leakage flux from each other. The ring-shaped tooth-groove iron cores 14 and 14' are formed by alternately arranging the tooth iron cores 14-1-14-K, 14-1'-14-K' each having a cross section of the same size at right angle to circumference and the grooves 15-1-15-K, 15-1'-15-K'. The tooth iron cores 14-1 and 14-1' are for making magnetic flux penetrate the ring-shaped tooth-groove iron cores 14 and 14' in the thickness direction, and the grooves 15-1-15K, 15-1'-15-K' for receiving the coils 16 wound parallel to the ring side surfaces. Both side surfaces of each of the large ring-shaped tooth-groove iron core 14 and the small ring-shaped tooth-groove iron core 14' have opposing surfaces to the below-described attraction poles 17-1-17-8. The tooth iron cores 14-1-14-K, 14-1'-14-K' and the coils 16 received in the groove 15-1-15-K, 15-1'-15-K' are reinforced with the strong lightweight member 4 for keeping the shapes of the rings.

The air-cooling duct 3 is formed of material having good thermal conductivity, and the outer peripheral surface of the duct 3 is in thermal contact with the inner peripheral surface of the coils 16 wound around the small ring-shaped tooth-groove iron core 14'. By flowing cooling air through the shaft center of the support shaft 5, cooling is performed by cooling fins inside the duct 3.

Figure 3:
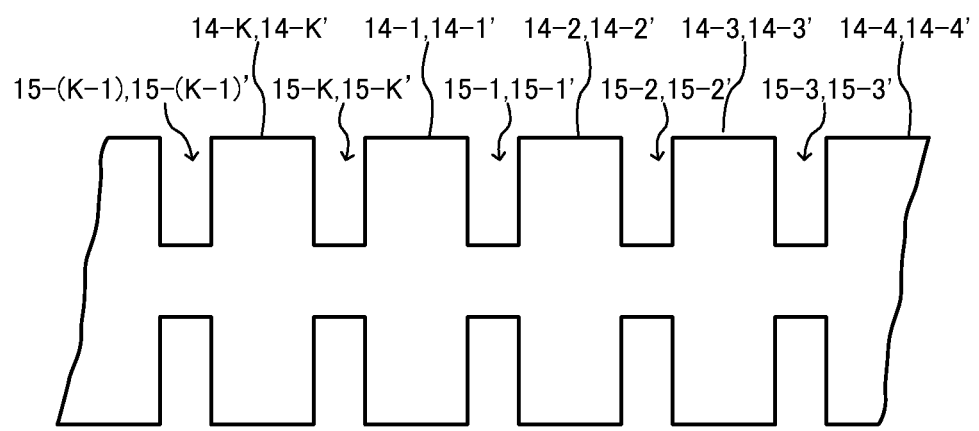
FIG. 3 illustrates tooth iron cores of the gearless in-wheel motor illustrated in FIG. 1.
Figure 3:
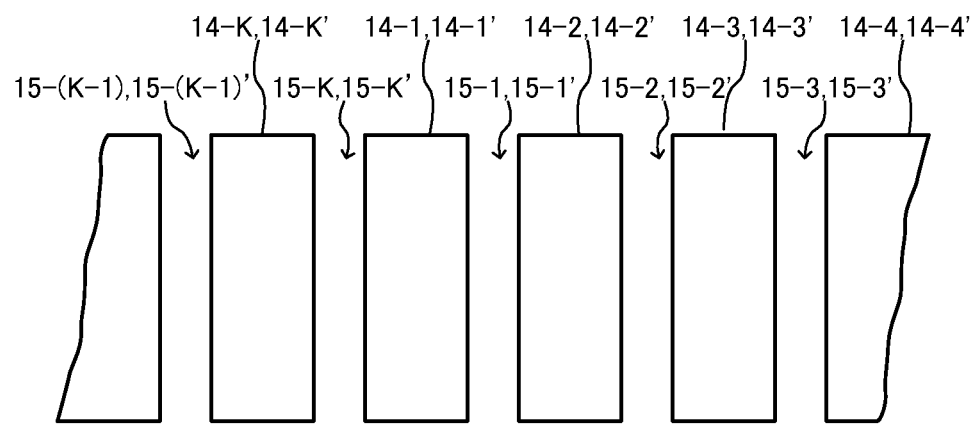

FIG. 3 is an explanatory view related to the tooth iron cores 14-1-14-K, 14-1'-14-K' in FIG. 1 and mechanical holding of the coils 16 received in the grooves 15-1-15-K, 15-1'-15-K'. FIG. 3[A] illustrates a structure in which the tooth iron cores 14-1-14K, 14-1'-14-K' are held in the whole iron core. The coils 16 in the grooves 15-1-15-K, 15-1'-15-K' only need to be varnished as usual. It is necessary that the phase coils are received in the grooves 15-1-15-K, 15-1'-15-K' symmetrically on both sides of each groove. In the structure of FIG. 3[B], required phase coils 16 only need to be received as they are, although the tooth iron cores 14-1-14-K, 14-1'-14-K', the grooves 15-1-15-K, 15-1'-15-K', and the coils 16 should be fixed by molding with strong insulating filler.

Figure 4:
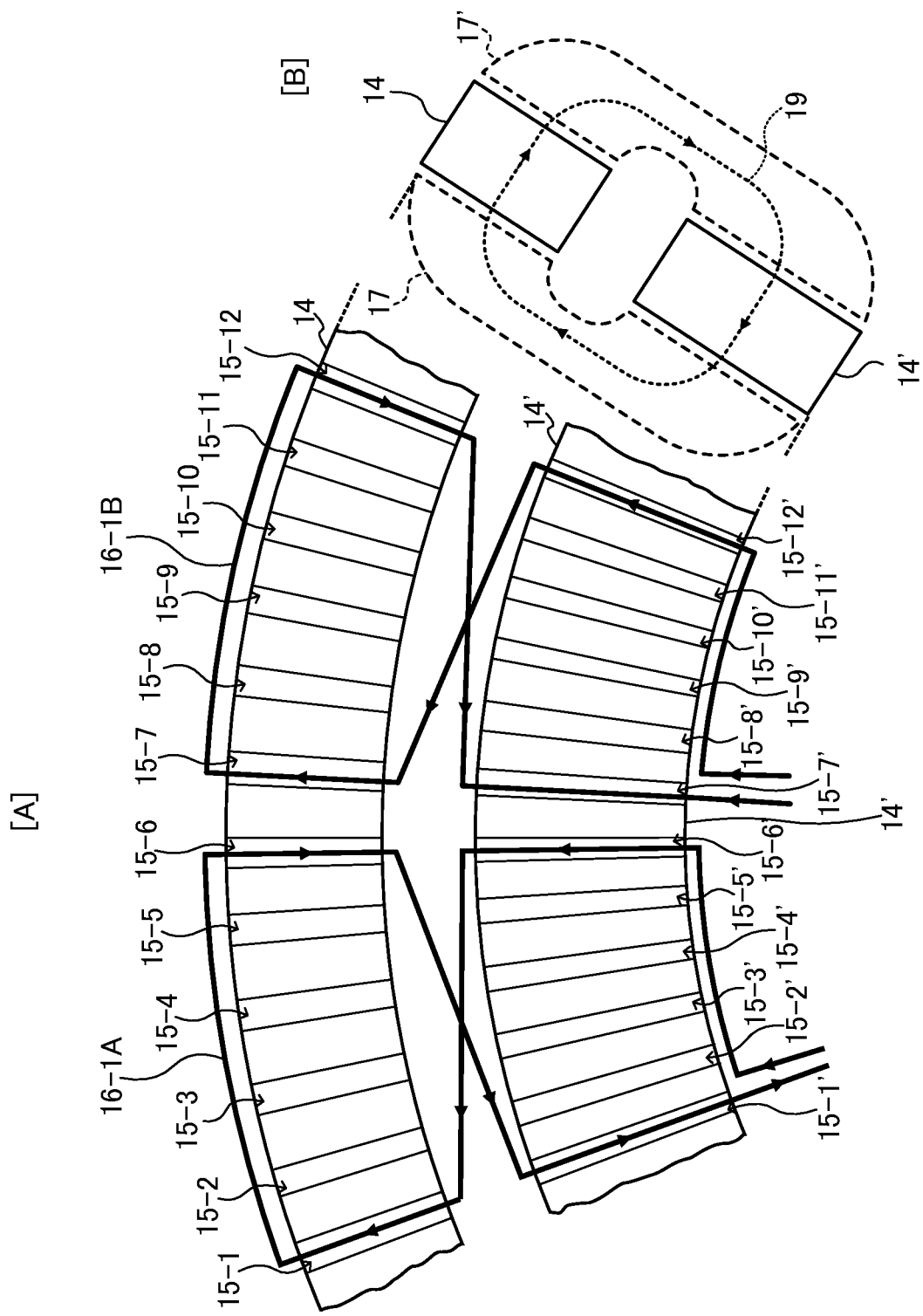
FIG. 4 is view for explaining a coil structure of the gearless in-wheel motor illustrated in FIG. 1.

FIG. 4 is a diagram for explaining coil structure related to FIGS. 2 and 3. Since the motor has the 16-pole 6-overlapping-phase structure, the magnetic pole pitch is 360°/16 poles=22.5°, the tooth iron core pitch and the groove pitch are 22.5°/6 overlapping phases=3.75°, and the number of the grooves in one circle is 16 [poles]×6 [overlapping phases]=96.

FIG. 4[A] illustrates part of the large ring-shaped tooth-groove iron core 14, the small ring-shaped tooth-groove iron core 14', and the grooves 15-1-15-96, 15-1'-15-96'. For a rotating direction of the rotor 2, the direction of increasing the suffix numbers is defined forward direction.

A coil 16-1A is wound by a predetermined number of turns, so as to encircle five tooth iron cores between the groove 15-1 and the groove 15-6 of the large ring-shaped tooth-groove iron core 14 clockwise with respect to the iron core and to encircle five tooth iron cores between the groove 15-1' and the groove 15-6' of the small ring-shaped tooth-groove iron core 14' positioned at the same angles as those of the groove 15-1 and the groove 15-6 inversely with the above direction, i.e. counterclockwise. Although not shown in FIG. 4[A], the same work is repeatedly carried out for the following eight positions at a pitch of two magnetic poles, i.e. at a pitch of twelve grooves.

Between the groove 15-1 and the groove 15-6, and between the groove 15-1' and the groove 15-6';

between the groove 15-13 and the groove 15-18, and between the groove 15-13' and the groove 15-18';

between the groove 15-25 and the groove 15-30, and between the groove 15-25' and the groove 15-30';

between the groove 15-37 and the groove 15-42, and between the groove 15-37' and the groove 15-42';

between the groove 15-49 and the groove 15-54, and between the groove 15-49' and the groove 15-54';

between the groove 15-61 and the groove 15-66, and between the groove 15-61' and the groove 15-66';

between the groove 15-73 and the groove 15-78, and between the groove 15-73' and the groove 15-78'; and between the groove 15-85 and the groove 15-90, and between the groove 15-85' and the groove 15-90'.

By connecting the above 8 coils in series, the coil 16-1A is formed.

Similarly, a coil 16-1B is formed by shifting the position by one magnetic pole pitch, i.e. six groove pitches, from the coil 16-1A as the basis. The coil 16-1A and the coil 16-1B are spaced by one groove pitch for providing spare time for coil's commutation time.

Further, coils 16-2A and 16-2B are respectively formed by shifting the positions by one groove pitch in the rotating direction with reference to the above coils 16-1A and 16-1B.

Further, coils 16-3A and 16-3B, coils 16-4A and 16-4B, coils 16-5A and 16-5B, and coils 16-6A and 16-6B are formed by shifting respectively by 2 groove pitches, 3 groove pitches, 4 groove pitches, and 5 groove pitches from the initial position.

The directions of the magnetomotive forces of the coils 16 are made unified in each of the large ring-shaped tooth-groove iron core 14 and the small ring-shaped tooth-groove iron core 14', and in reverse relation between the large ring-shaped tooth-groove iron core and the small ring-shaped tooth-groove iron core. In FIG. 4[A], the magnetomotive forces in the large ring-shaped tooth-groove iron core 14 are in the direction toward the iron core surface, and the magnetomotive forces in the small ring-shaped tooth-groove iron core 14' are in the reverse direction. As illustrated in FIG. 4[B], through opposite attraction poles 17 and 17', this generates circulating flux that forms a magnetic path 19. Even when the attraction poles 17 and 17' are at any positions of the large and small ring-shaped tooth-groove iron cores 14 and 14', generated magnetic flux circulation is in the same direction.

The rotor 2 is formed mainly by 16 attraction poles 17-1-17-8, 17-1'-17-8'. Referring to FIG. 2, shapes and relative mounting positions of the attraction poles 17-1-17-8, 17-1'-17-8' will be described. These attraction poles 17-1-17-8, 17-1'-17-8' are each one magnetic pole pitch wide, and both end surfaces of each attraction pole are each opposed to the large ring-shaped tooth-groove iron core 14 and the small ring-shaped tooth-groove iron core 14'. Further, the material of the attraction poles 17-1-17-8, 17-1'-17-8' is ferromagnetic steel plate. Further, the attraction poles 17-1-17-8 and the attraction poles 17-1'-17-8' are arranged in pairs so that one pair of attraction poles face each other at the same location via the air gap 6 across the large and small ring-shaped tooth-groove iron cores 14 and 14'. A total of eight pairs of attraction poles are reinforced for example by a mold structure in a state that these eight pairs of attraction poles are arranged in the circumferential direction of the rotor 2 at intervals of two magnetic poles.

As for each pair of opposed attraction poles 17-1 and 17-1'-17-8 and 17-8', consideration is required with respect to existence of strong attraction force between both poles, reception of deviating force causing movement to one side, and separation of part of the structure at the time of assembling.

Owing to the combination of the dual ring-shaped tooth-groove iron cores 14 and 14' having magnetic pole surfaces on both sides and the attraction poles 17-1-17-8, 17-1'-17-8' having the opposed surfaces at both ends, it is possible to increase the facing area between the stator 1 and the rotor 2 to a large extent by adding the minimum iron core material, having a great effect in increase in the torque weight ratio.

Figure 5:
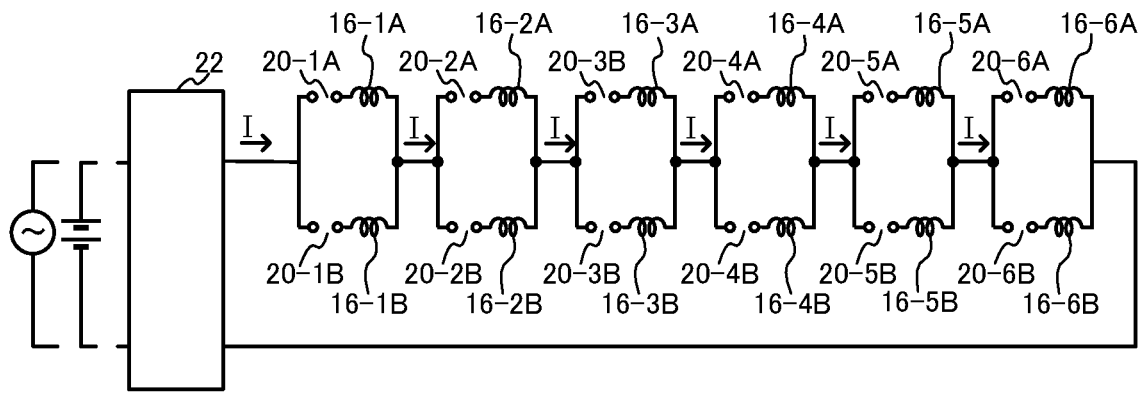
FIG. 5[A] illustrates connection of FF switches and coils relating to FIG. 1, and FIG. 5[B] coil current waveforms of the gearless in-wheel motor illustrated in FIG. 1.
Figure 5:
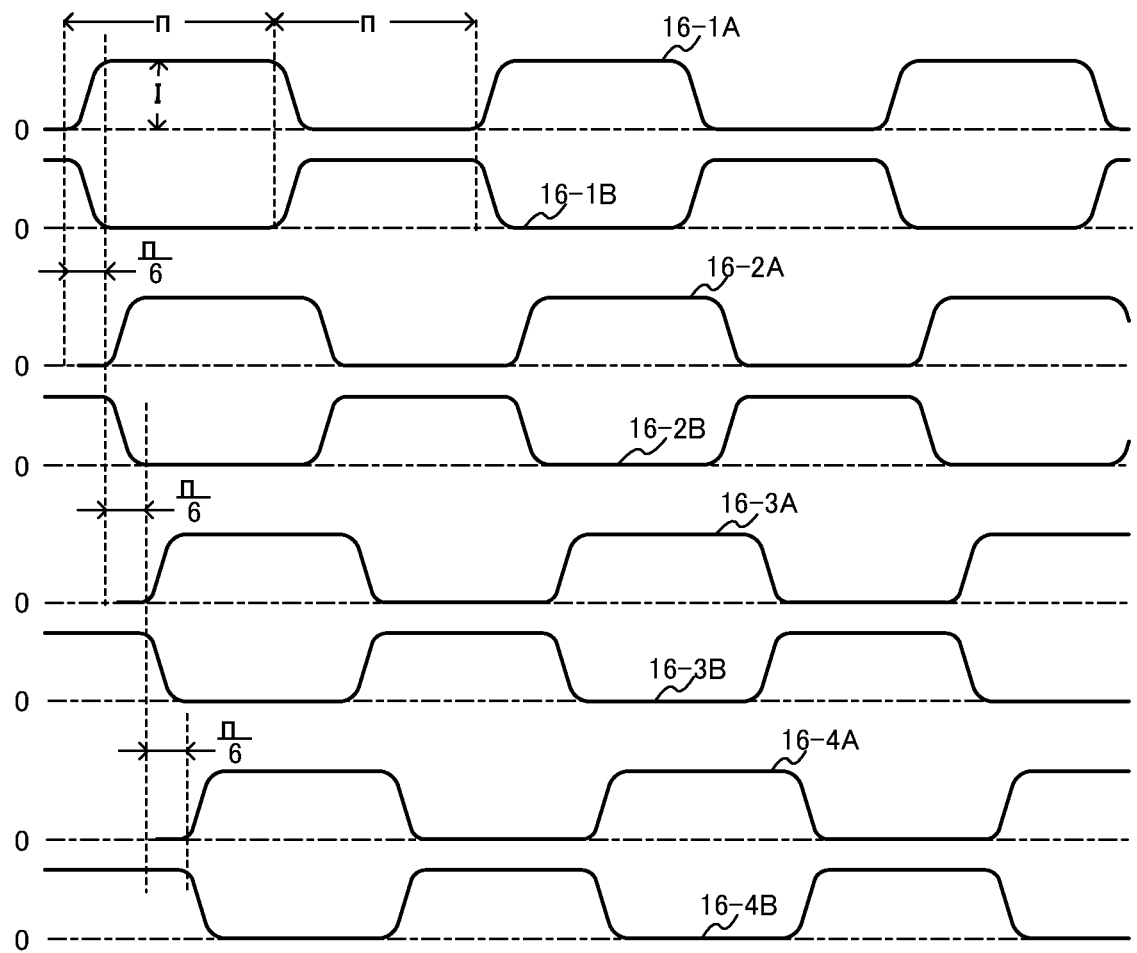

FIG. 5 is a diagram for explaining connection between FF switches and coils relating to FIG. 1 and motor's coil current waveforms.

FIG. 5[A] is a diagram for explaining connection of a two-quadrant constant current control circuit 22, the coils 16-1A-16-6A, 16-1B-16-6B, and the FF switches 20-1A-20-6A, 20-1B-20-6B.

The two-quadrant constant current control circuit 22 outputs set constant current I, and operation of this circuit will be described below.

The coils 16-1A and 16-1B as commutation counterparts are connected in parallel via the FF switches 20-1A and 20-1B to form an FF switch unit. The constant current I is supplied from the quadrant constant current control circuit 22 to an FF switch in an ON state. The current flows one of the commutation counterpart coils 16-1A and 16-1B and then is inputted as constant current I to the next FF switch unit. This is repeated 6 times in total.

Although each FF switch 20 is expressed by using an ordinary switch symbol in FIG. 5, actually a semiconductor switch such as IGBT is used and processing such as over-voltage control using capacitor or the like is required.

FIG. 5[B] illustrates current waveforms of the coils 16-1A and 16-1B-16-6A and 6-6B of the FF switch units. The coil current waveforms of twelve phases are each pulsating trapezoidal wave having a peak value I, and the coil waveforms of the FF switch units shift in phase from one to the next by $\pi/6$. Operations of the FF switches 20-1A-206A, 20-1B-20-6B in FIG. 5[B] are performed in the order shown in Table 1.

TABLE 1

| Operation Mode | Groove position of leading edge of attraction pole 17-1 | FF switch | | | | | | | | | | | |
|---|---|---|---|---|---|---|---|---|---|---|---|---|---|
| | | 20-1A | 20-2A | 20-3A | 20-4A | 20-5A | 20-6A | 20-1B | 20-2B | 20-3B | 20-4B | 20-5B | 20-6B |
| 1 | 15-5 | ○ | ○ | ○ | ○ | ○ | ○ | X | X | X | X | X | X |
| 2 | 15-6 | X | ○ | ○ | ○ | ○ | ○ | ○ | X | X | X | X | X |

TABLE 1-continued

| Operation Mode | Groove position of leading edge of attraction pole 17-1 | FF switch | | | | | | | | | | | |
|---|---|---|---|---|---|---|---|---|---|---|---|---|---|
| | | 20-1A | 20-2A | 20-3A | 20-4A | 20-5A | 20-6A | 20-1B | 20-2B | 20-3B | 20-4B | 20-5B | 20-6B |
| 3 | 15-7 | X | X | ○ | ○ | ○ | ○ | ○ | ○ | X | X | X | X |
| 4 | 15-8 | X | X | X | ○ | ○ | ○ | ○ | ○ | ○ | X | X | X |
| 5 | 15-9 | X | X | X | X | ○ | ○ | ○ | ○ | ○ | ○ | X | X |
| 6 | 15-10 | X | X | X | X | X | ○ | ○ | ○ | ○ | ○ | ○ | X |
| 7 | 15-11 | X | X | X | X | X | X | ○ | ○ | ○ | ○ | ○ | ○ |
| 8 | 15-12 | ○ | X | X | X | X | X | X | ○ | ○ | ○ | ○ | ○ |
| 9 | 15-13 | ○ | ○ | X | X | X | X | X | X | ○ | ○ | ○ | ○ |
| 10 | 15-14 | ○ | ○ | ○ | X | X | X | X | X | X | ○ | ○ | ○ |
| 11 | 15-15 | ○ | ○ | ○ | ○ | X | X | X | X | X | X | ○ | ○ |
| 12 | 15-16 | ○ | ○ | ○ | ○ | ○ | X | X | X | X | X | X | ○ |

Notes:
○ denotes ON, and X OFF.

For rotation in the forward direction, operations occur in the order of the sequence numbers of operation order.

When the FF switch operation pattern with respect to the attraction pole position is shifted by six places, the mode is changed into the braking mode and the backward mode.

FIGS. 6-9 illustrate basic configurations (1)-(4) for explaining operation of the gearless in-wheel motor relating to FIGS. 1 and 2. In FIGS. 1 and 2, the gearless in-wheel motor of the present embodiment has 16-pole 6-phase 4-surface structure, and there are 16 attraction poles 17-1-17-8, 17-1'-17-8' in total. However, in FIGS. 6-9, 2-pole 6-overlapping-phase structure is illustrated as basic configuration of the gearless in-wheel motor for the sake of convenience of explanation. Further, the number of attraction poles is simplified to one, and linearized illustration is employed for the sake of easiness of viewing. The structure of magnetic path is not completed, assuming the existence of the magnetic path 19 illustrated in FIG. 4[B].

Figure 6:
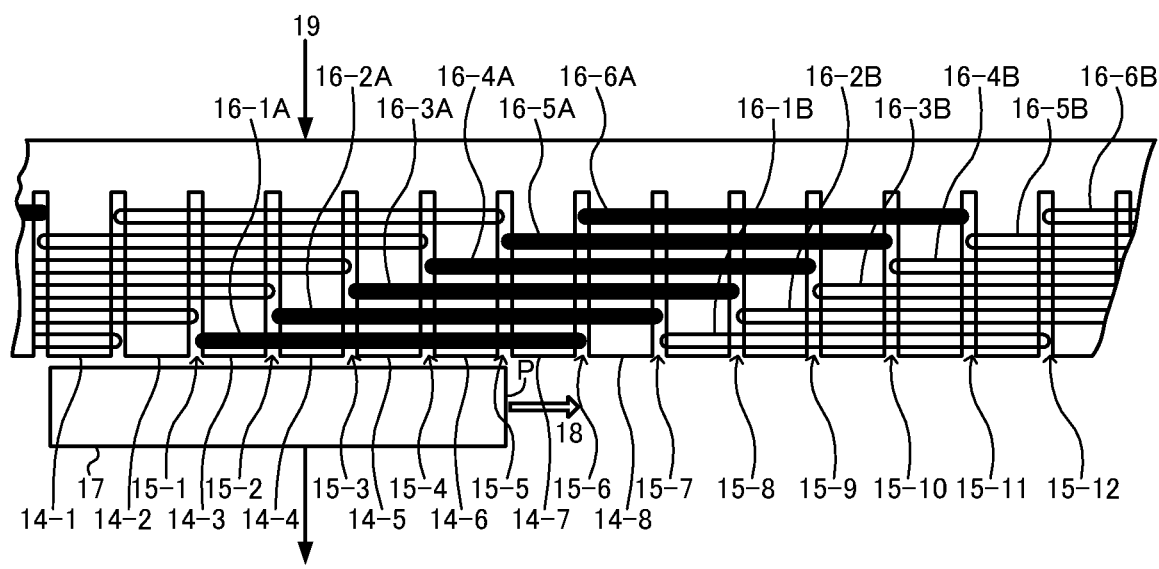
FIG. 6 illustrates a basic configuration (1) for explaining operation.
Figure 6:
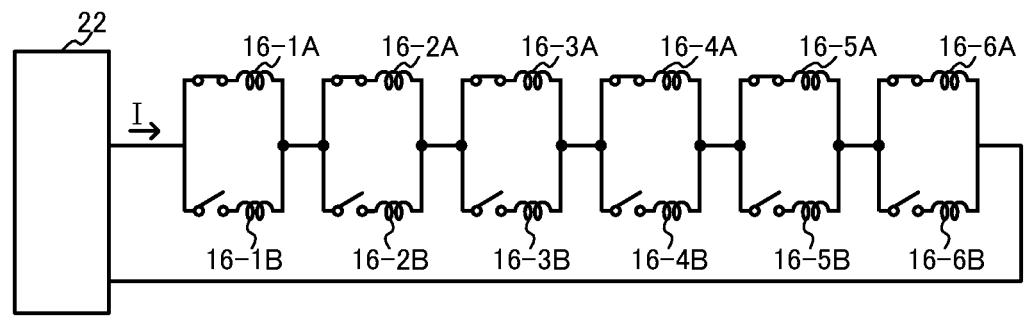

FIG. 6 illustrates a basic configuration (1) in the case where the leading edge P of the attraction pole 17 is at the position of the groove 15-5.

In a state that the leading edge P of the attraction pole 17 is at the position of the groove 15-5 as illustrated in FIG. 6[A], all of the FF switches 20-1A-20-6A are ON, and all of the FF switches 20-1B-20-6B are OFF, and supply current I=430 A from the two-quadrant constant current control circuit 22 flows through the coils 16-1A-16-6A. The coils through which current flows are blackened. The attraction pole 17 receives force in the direction 18 in which magnetic flux increases.

The following specifications were given in this way of consideration, and basic characteristics were examined under simple conditions.

Motor structure: basic 2 phases×6 overlapping phases=12 phases
Coil shape and size: width 0.025 [m], length 0.0633 [m]
Magnetic pole length: 0.076 [m]
Coil AT: 430 [AT] (one turn construction), air gap length 0.002 [m]
Tooth iron core size: length 0.025 [m], width 0.0127 [m]
Attraction pole: length 0.076 [m], width 0.025 [m]
Attraction pole moving speed: 21.5 [m/S]
Passing time of one tooth iron core: $5.91 \times 10^{-4}$ [S]

For the sake of simplicity, the groove width, leakage flux, and diffusion of magnetic flux are not considered here.

The magnetic flux density in the air gap where attraction poles are opposed is obtained from:

$$430[AT] = B \cdot g/\mu_0$$

per coil according to the general theory of electromagnetics. This gives B=0.27 [T]. Here, B denotes air-gap magnetic flux density [T], g air gap length, and $\mu_0 = 4\pi \times 10^{-7}$.

A flux change at the tooth iron core 14-7 owing to movement of the attraction pole is magnetic flux $4.29 \times 10^{-4}$ [weber] owing to added magnetomotive force of five coils i.e. the coils 16-1A-16-5A. Considering the passing time of the attraction pole leading edge P through the tooth iron core 14-7, electromotive force becomes 3.63 [V]. Generation of the magnetic flux at the tooth iron core 14-7 by adding five magnetomotive forces and generation of the electromotive force by adding five electromotive force result from the mutually-connected state of all the five coils.

Here, the magnetomotive forces and the electromotive forces are added with respect to not six but five coils in spite of the six overlapping phase structure. This is because the coil length corresponds to five tooth iron cores although one magnetic pole length corresponds to six tooth iron cores.

The set value of the two-quadrant constant current control circuit 22 is 430 [A] in the basic configuration (1), and 1560 [W] is automatically supplied for positive load electromotive force 3.63 [V]. Energy supply from the power source due to this is performed only during the passing time of the tooth iron core 14-7, and the supplied electrical energy is 0.922 [J]. This is repeated also for the tooth iron cores 14-8-14-K, and accordingly occurs in effect continuously.

Figure 7:
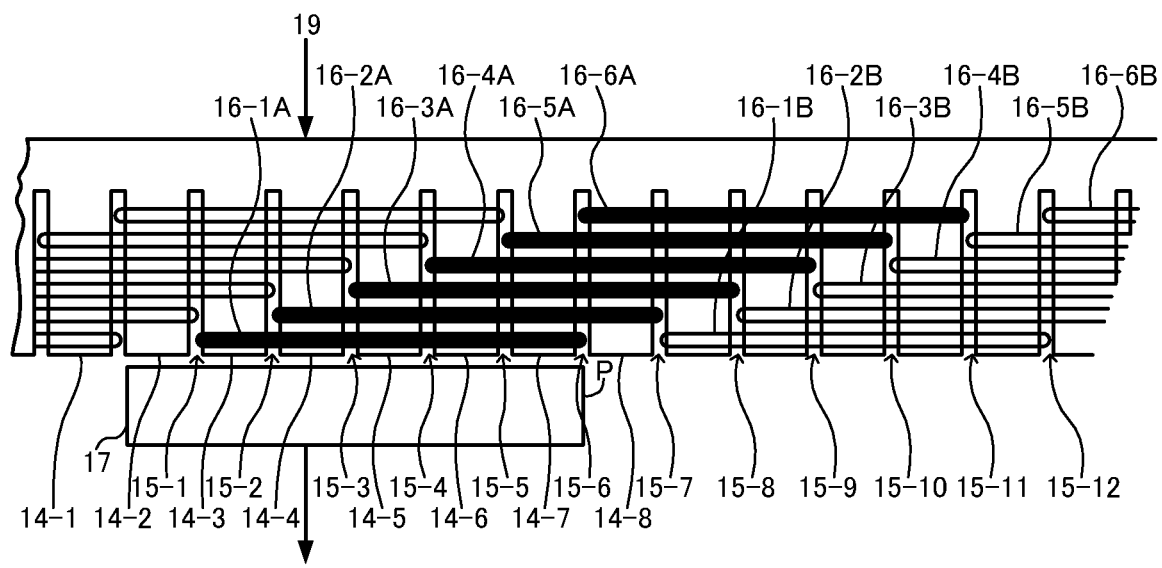
FIG. 7 illustrates a basic configuration (2) for explaining operation.
Figure 7:
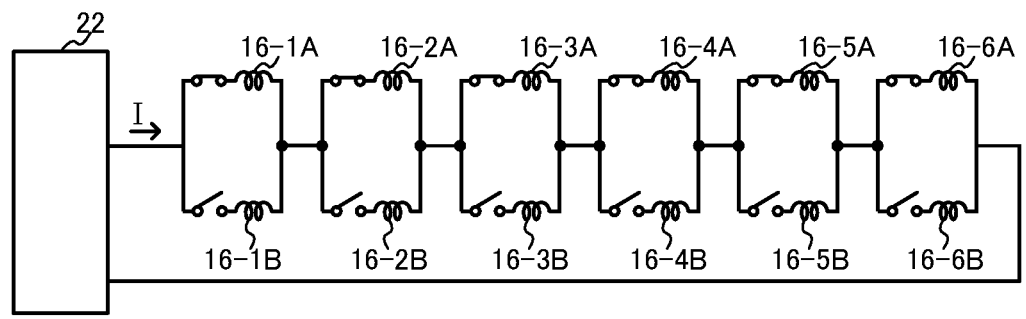

FIG. 7 illustrates a basic configuration (2) for explaining operation in the case where the leading edge P of the attraction pole 17 moves from the position of the groove 15-5 to the position of the groove 15-6. The tooth iron cores 14-3, 14-4, 14-5, and 14-6 in FIG. 7 have exactly the same magnetomotive force and the same air gap length as the tooth iron cores having the same reference numerals in FIG. 6, and their respective air-gap magnetic flux density are exactly the same. Only the air gap of the tooth iron core 14-7 is in different conditions. The magnetic energy of a coil is same as the magnetic energy of an air gap, and according to the movement of the attraction pole 17, the air-gap magnetic energy of the tooth iron core increases from the state "0" in FIG. 6 to the state in FIG. 7. According to the general theory of electromagnetics, the air-gap magnetic energy is expressed as follows.

$$E_L = \frac{B^2 C}{2\mu_0} \quad \text{[Eq. 1]}$$

Here, $E_L$: air-gap magnetic energy [J]
B: air-gap magnetic density [T]
C: air gap volume [m³]
$\mu_0$: $4\pi \times 10^{-7}$
This gives $E_L = 0.461$ [J].

The above energy $E_L = 0.461$ [J] corresponds to ½ of the supplied electrical energy calculated above. It is said that ½ of the supplied electrical energy is outputted as the energy of mechanical work in the course of the attraction operation and the remaining ½ of the supplied electrical energy remains as magnetic energy in a coil or an air gap.

According to the general theory of mechanics, the value of attraction force can be calculated by dividing the mechanical output by the moving distance, to obtain 36.3 [N] in this case.

Figure 8:
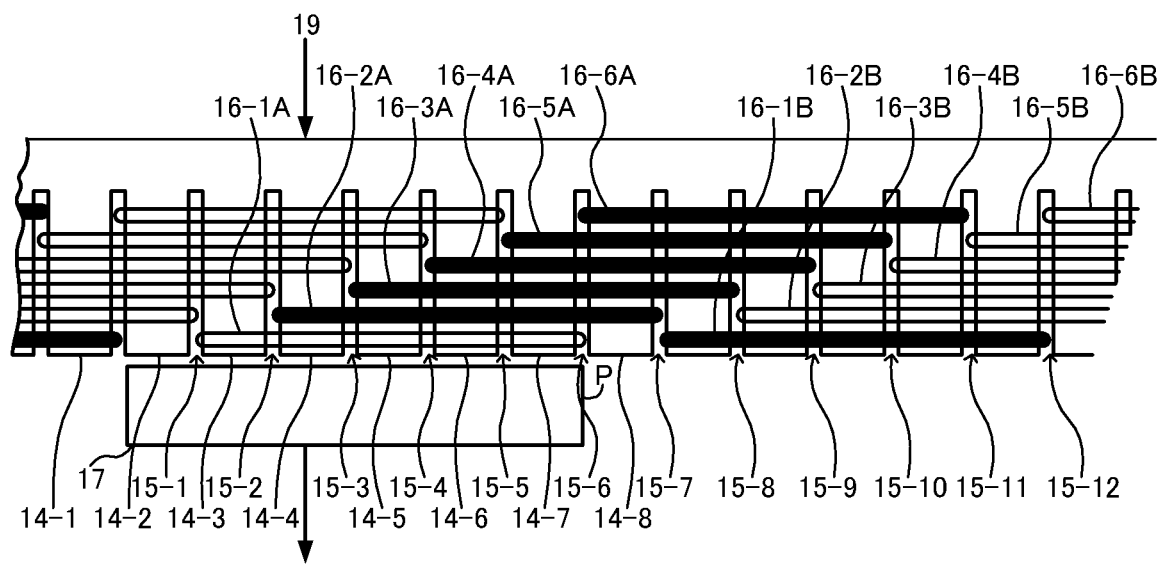
FIG. 8 illustrates a basic configuration (3) for explaining operation.
Figure 8:
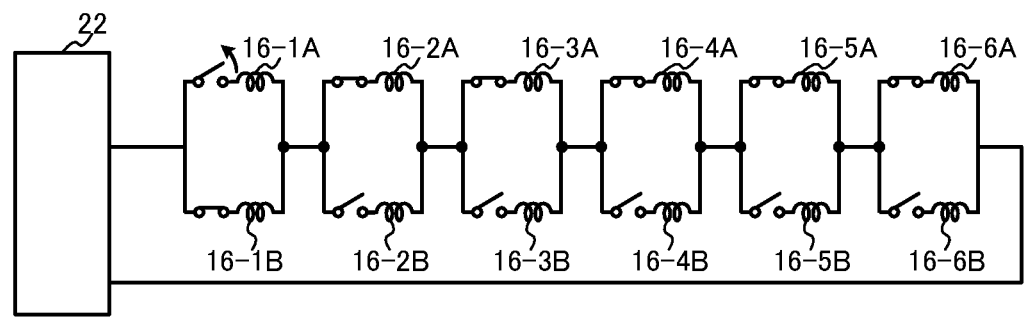

FIG. 8 illustrates a basic configuration (3) for explaining commutation operation that is performed after the attraction operation corresponding to one tooth iron core.

At a point of time when the leading edge P of the attraction pole reaches the position of the groove 15-6, commutation from the coil 16-1A to the coil 16-1B is performed by instructions of the FF switch 20-1A OFF and the FF switch 20-1B ON in response to an angular position signal from the angular position detector 7. At the time of the commutation of the coil 16-1A, the magnetic energy of the self-inductance of the coil 16-1A and the magnetic energy of the mutual inductances of the coil 16-1A with the coils 16-2A, 16-3A, 16-4A and 16-5A are recovered by the power source with high efficiency through each phase coil, being shared through the commutation circuit and the mutual connections under the conditions common to transient time. In other words, the energy amount for coil current switching is reduced approximately to a value of the energy amount divided by the number of the overlapping phases, and further this value is doubly reduced approximately to the value divided by the number of the overlapping phases through the interconnected circuit configuration.

As for state of currents flowing the coils 16 and position of the attraction pole 17 of the FIG. 8, the absolute position is advanced from FIG. 6 by one tooth iron core in the direction of forward movement, and the relative relation between them is not changed. By proceeding in turn this way, it is possible to generate continuous torque.

Figure 9:
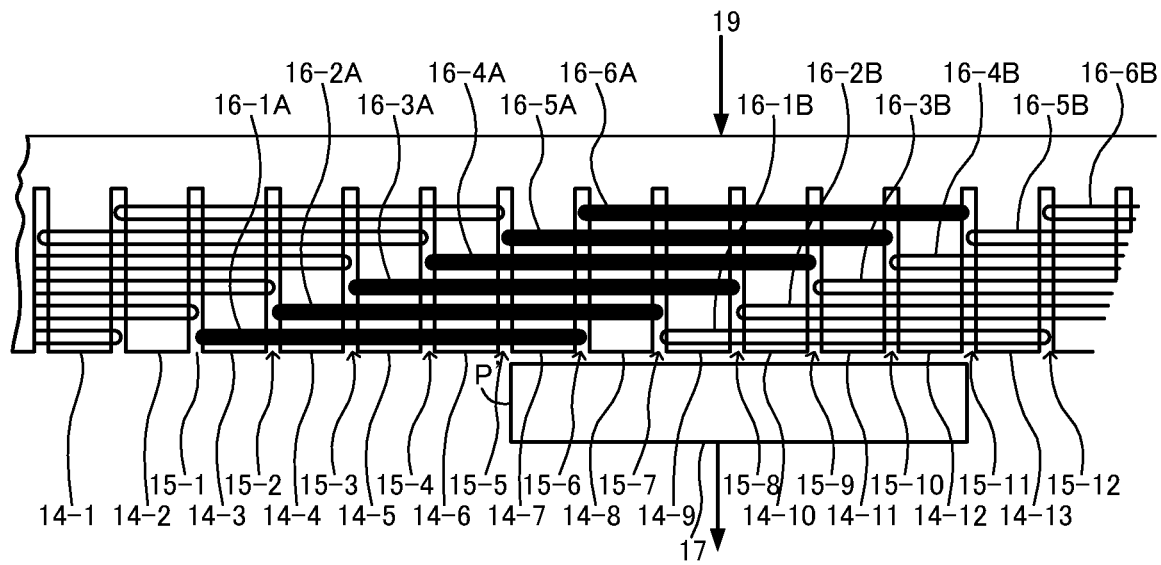
FIG. 9 illustrates a basic configuration (4) for explaining operation.
Figure 9:
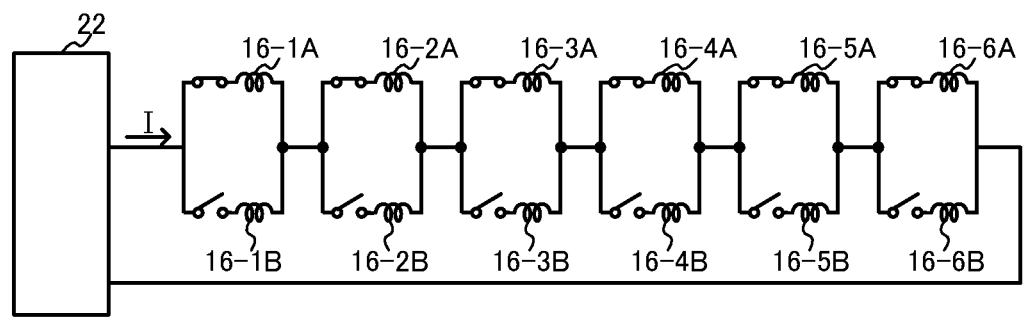

FIG. 9 illustrates a basic configuration (4) for explaining braking operation. The braking mode can be generated by shifting the current flowing mode of the coils 16 with respect to the attraction pole 17 by six groove pitches, i.e. one magnetic pole length. In the driving operation illustrated in FIG. 6, driving force is generated in the process that the leading edge P of the attraction pole 17 reaches the position of the tooth iron core 14-7. On the other hand, in the braking operation, braking force is generated in the process that the trailing edge P' of the attraction pole 17 passes through the position of the tooth iron core 14-7.

In the driving operation illustrated in FIG. 6, positive electromotive force is generated in the coils according to the Faraday's law in the process that the leading edge P of the attraction pole 17 enters the position of the tooth iron core 14-7, and electrical energy of 0.922 [J] is supplied from the power source side. A half of the energy becomes output as the mechanical energy of driving force. The other half remains as magnetic energy in the coils, and is recovered by the power source side at the time of the commutation from the coil 16-1A to the coil 16-1B in FIG. 8.

In the braking operation illustrated in FIG. 9, negative electromotive force is generated in the coil according to the Faraday's law in the process that the trailing edge P' of the attraction pole 17 passes through the position of the tooth iron core 14-7, and electrical energy of 0.922 [J] is regenerated. A half of the energy is the mechanical energy of the braking operation and the other half is the electrical energy temporarily borrowed from the power source at the time of the commutation from the coil 16-1A to the coil 16-1B.

Figure 10:
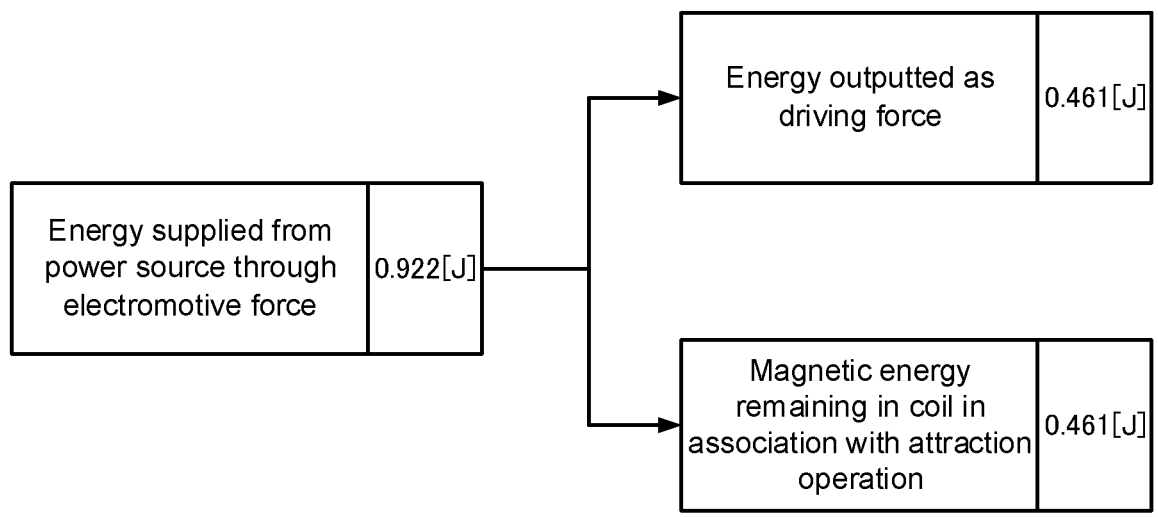
FIG. 10 illustrates flow of energy at the time of driving.
Figure 11:
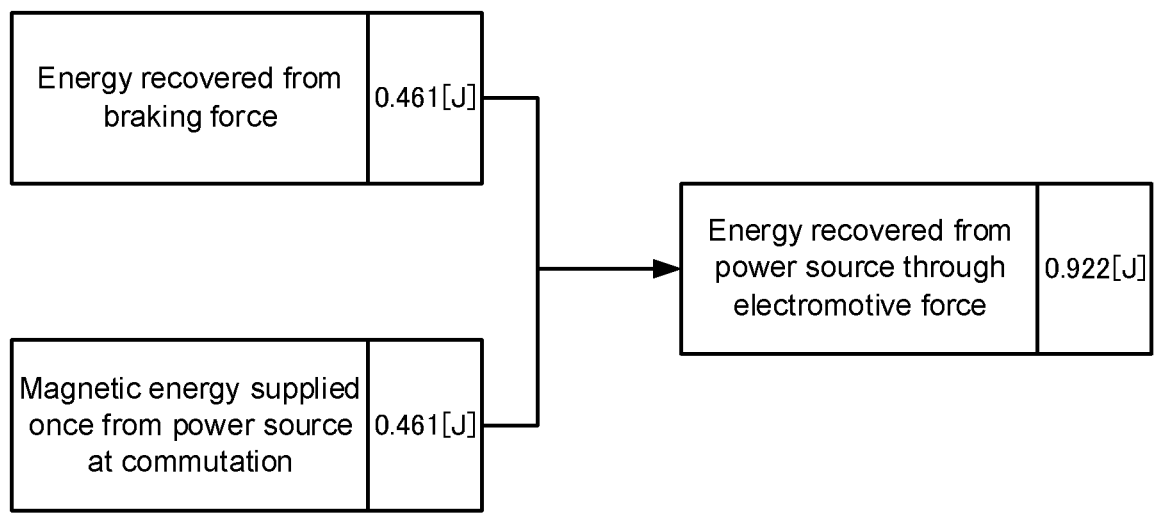
FIG. 11 illustrates flow of energy at the time of braking.

FIGS. 10 and 11 are block diagrams illustrating flows between three forms of energy, i.e. the power source side electrical energy, the driving/braking energy, and the magnetic energy, at the driving and braking operations. Transfer between the three forms of energy occurs with high efficiency of about 90%.

The two-quadrant constant current control circuit is a circuit configuration arranged to perform control by itself so that constant direct current corresponding to a set value flows in a constant direction with respect to load electromotive force that changes variously in a two-quadrant area, i.e. a positive-and-negative-quadrant area for input from an alternating-current or direct-current power source. Depending on the state on the load side, energy flow is generated automatically.

Figure 12:
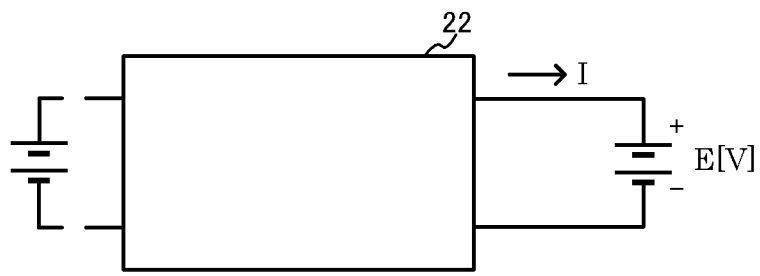
FIG. 12 illustrates operations of a two-quadrant constant current power source for various loads.
Figure 12:
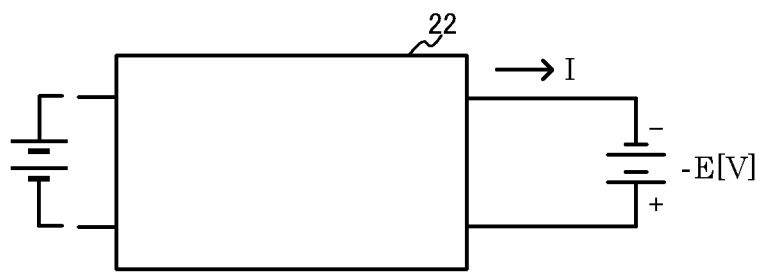
Figure 12:
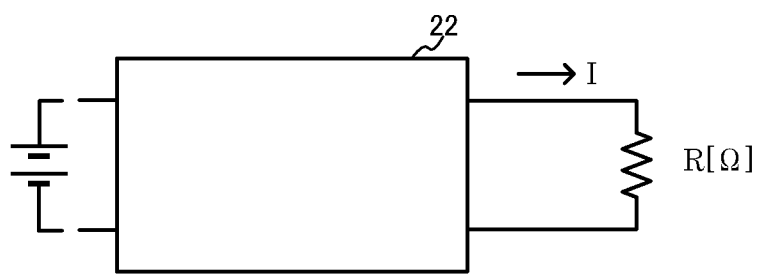
Figure 12:
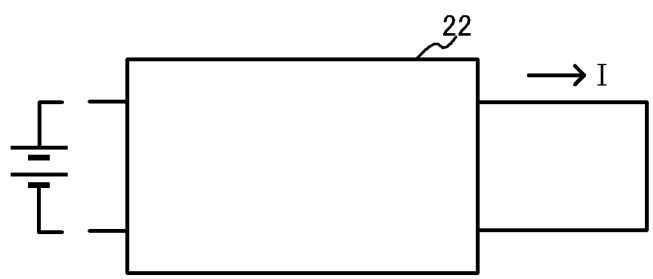

As illustrated in FIG. 12[A], when there is electromotive force of +E [V] on the load side, electric power EI [W] is supplied to the load side. Here, I [A] is a set value [A] of the two-quadrant constant current control circuit.

As illustrated in FIG. 12[B], when there is electromotive force of −E [V] on the load side, electric power EI [W] is regenerated on the power source side. In the case where the load electromotive force on the load side is the electromotive force according to the Fleming's right-hand rule or the Faraday's law, highly-efficient reversible conversion operation between electrical energy and mechanical energy is performed without special control on the power source side and the load side.

As illustrated in FIG. 12[C], when there is a resistance R [Ω] on the load side, electric power $I^2R$ [W] is supplied to the load side and converted into heat.

As illustrated in FIG. 12[D], when the load side is short-circuited by a conductor of a resistance 0, current I flows but transfer of electric power does not occur.

Now, operation of an FF switch circuit will be described. As illustrated in FIG. 5, an FF switch circuit is formed by connecting FF switch units in series to the number of the overlapping phases, with each FF unit being formed by connecting in parallel an A-phase coil and a B-phase coil as commutation partners on the inlet and outlet sides via FF switches so that the inputted constant current I flows in either coil.

For all the FF switch units connected in series, current is the constant current I on the input side and the output side, and any FF switch unit has basically the same operation state except at the time of commutation operation. Accordingly, description of operation of a single FF switch can be applied also to operation of the FF switch circuit.

Figure 13:
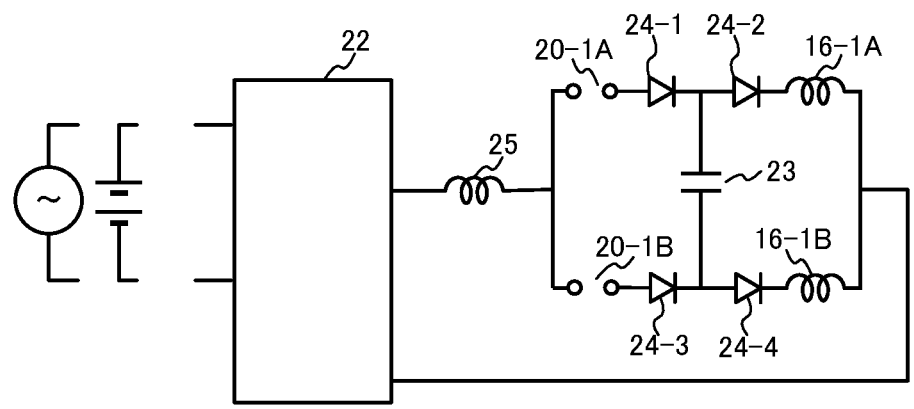
FIG. 13 illustrates diagrams for explaining basic operation of FF switches.
Figure 13:
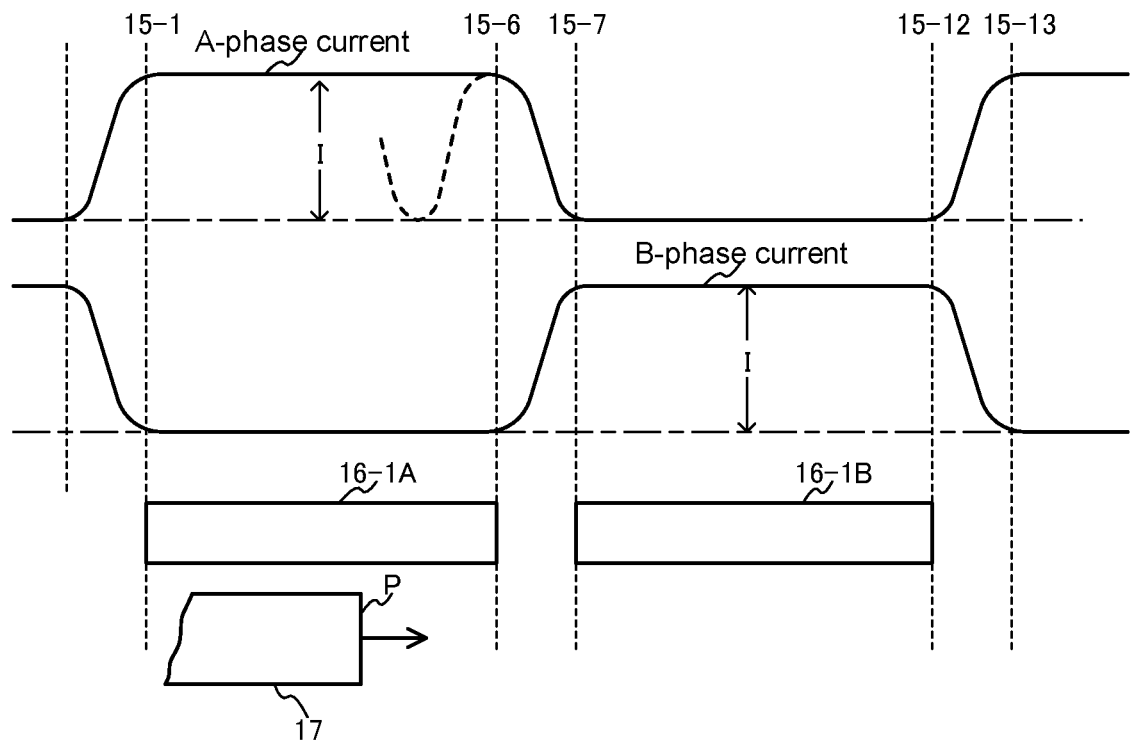

FIG. 13[A] illustrates an FF switch unit formed by the coil 16-1A and the coil 16-1B referring to FIG. 8. In this figure, the FF switch 20-1A is a switch for making current flow steadily to the A-phase coil 16-1A. Similarly, the FF switch 20-1B is a switch for making current flow steadily to the B-phase coil 16-1B. The reference numeral 23 denotes a commutating capacitor, which is for storing magnetic energy of the coils 16-1A and 16-1B temporarily to help the commutation operation. The reference numerals 24-1, 24-2, 24-3, and 24-4 denote diodes, which are for holding the charge of the commutating capacitor so that the charge does not escape. The reference numeral 25 denotes a commutation reactor, which is for suppressing current variation in very short time.

FIG. 13[B] is a diagram for explaining the relative relation between the coils 16 and the attraction pole 17 and coil current waveforms.

When the leading edge P of the attraction pole 17 passes through the front end of any coil, a commutation signal for that coil is given. For example, when the leading edge P of the attraction pole 17 passes through the front end of the coil 16-1A, a signal of A-phase coil OFF and B-phase coil ON is outputted. Further, when the leading edge P of the attraction pole 17 passes through the front end of the coil 16-1B, a signal of B-phase coil OFF and A-phase coil ON is outputted.

Figure 14:
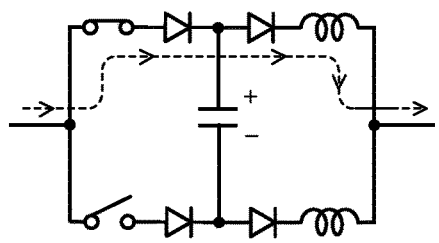
FIG. 14 illustrates commutation operation.
Figure 14:
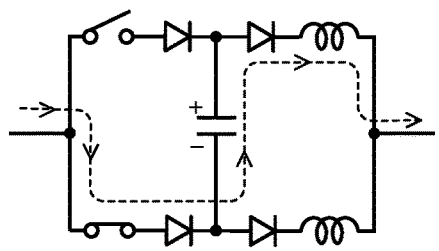
Figure 14:
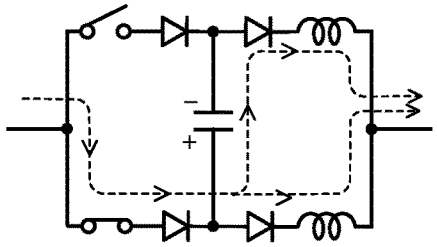
Figure 14:
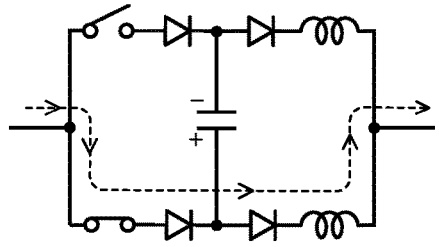
Figure 14:
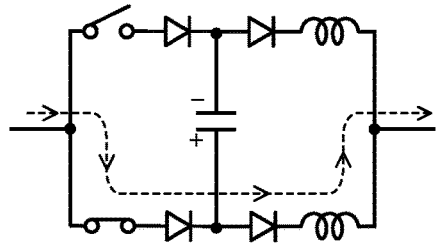
Figure 14:
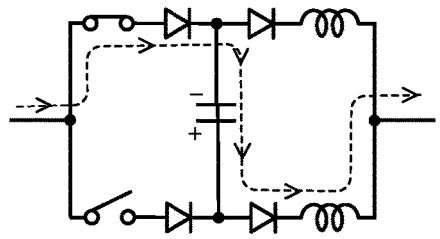
Figure 14:
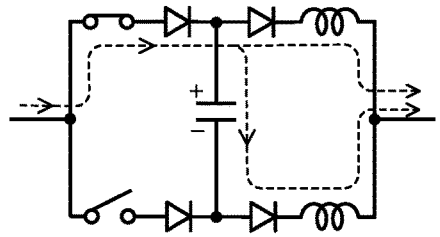
Figure 14:
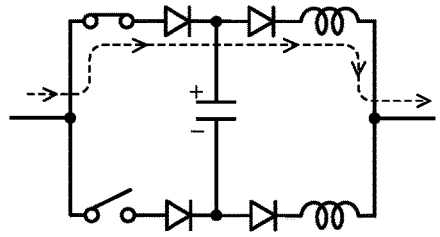

FIG. 14 is a diagram for explaining a commutation process of the FF switches 20 illustrated in FIG. 13[A]. FIGS. 14[A]-14[D] illustrate commutation from the A-phase coil to the B-phase coil, and FIGS. 14[E]-14[H] commutation from the B-phase coil to the A-phase coil. In the figures, FIG. 14[A] illustrates a state in which the A-phase coil is steadily ON, FIG. 14[B] a state in the course of commutation from the A-phase coil to the B-phase coil, FIG. 14[C] similarly a state in the course of commutation, and FIG. 14[D] a state in which commutation has been finished. Further, in the figures, FIG. 14[E] illustrates a state in which the B-phase coil is ON, FIG. 14[F] a state in the course of commutation from the B-phase coil to the A-phase coil, FIG. 14[G] similarly a state in the course of commutation, and FIG. 14[H] a state in which commutation has been finished.

The transient wave time of the commutation is mainly determined by the capacitance of the commutating capacitor 23 and the circuit constant of the inductance of each coil.

The rotating direction length of the attraction pole 17 is set to the length of one magnetic pole length, i.e. six tooth iron cores, and the rotating direction length of each coil is set to the length of five tooth iron cores. By this, the transient wave time of the commutation can be made not to have negative effects on torque.

Assuming that rising and falling waveforms of coil current approximately follow the half-cycle shape of the LC resonance waveform of the commutation circuit, approximate values of the capacitance of the commutating capacitor and the overvoltage at the time of commutation can be calculated as follows. That is:

Commutating capacitor's capacitance: [Eq. 2]

$$\text{from } f_0 = \frac{1}{2\pi\sqrt{LC}}$$

$$C = \frac{1}{(2\pi f_0)^2 L}[F]$$

Commutation time voltage:

$$2\pi f_0 LI[V]$$

where f: fundamental frequency=½ nP at the maximum rotating speed
$f_0$: commutation equivalent frequency=Mf
C: commutating capacitor's capacitance [F]
L: coil's inductance [H]
  (inductance of one coil to which the attraction pole is opposed over the whole surface)
n: maximum rotating speed [per second]
P: number of poles
M: number of overlapping phases The characteristic expressions corresponding to the motor of the present embodiment illustrated in FIGS. 1-5 are illustrated in the following.

$$Ea = N\frac{BS}{T} \times \frac{P}{2} \times (M-1)QK \times \frac{1}{2} \quad [\text{Eq. 3}]$$

$$1N = \frac{B \cdot g}{\mu_0}[\text{ampere turns}]$$

$$W = EaI[\text{watt}]$$

$$\tau = \frac{W}{2\pi n}[\text{N} \cdot \text{m}]$$

where Ea: total electromotive force [V]
N: number of coil's turns
B: magnetic flux density [T]
S: coil area [m²]
T: traveling time of the attraction pole over coil [S]
P: number of magnetic poles
M: number of overlapping phases
Q: number of magnetic pole surfaces
K: correction coefficient (approximately 0.8)
$\mu_0$: $4\pi \times 10^{-7}$
g: air gap length [m]
I: coil current
W: output [watt]
n: rotating speed per second Now, differentiation of the interconnection-composite-type motor of the present embodiment from the motors described in the Patent Literature 1 and the Non-patent Literatures 1 and 2 will be described.

Figure 15:
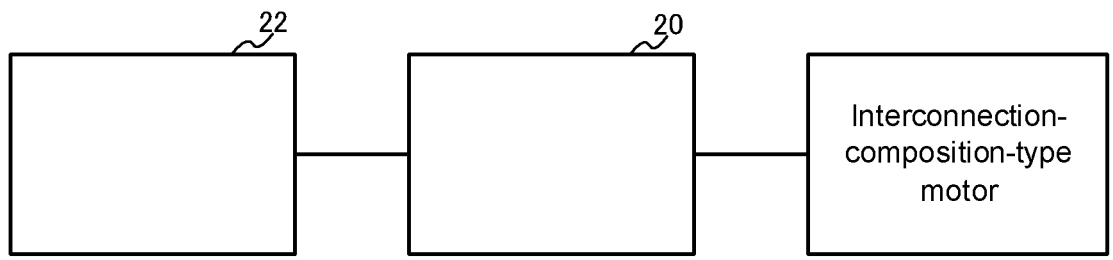
FIG. 15 illustrates differentiation between the motor of the present invention and the motors of the conventional technique.
Figure 15:
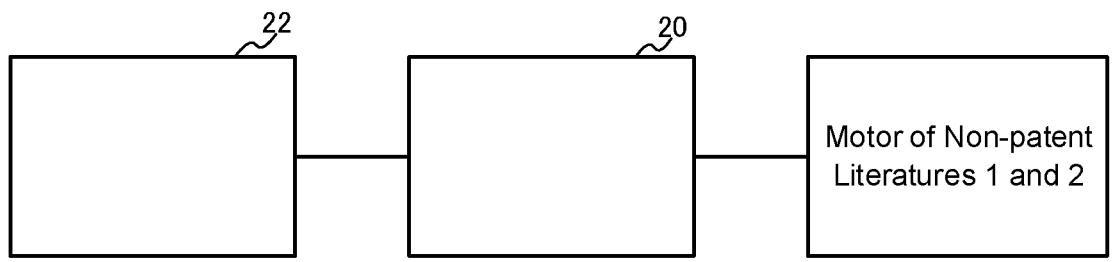
Figure 15:
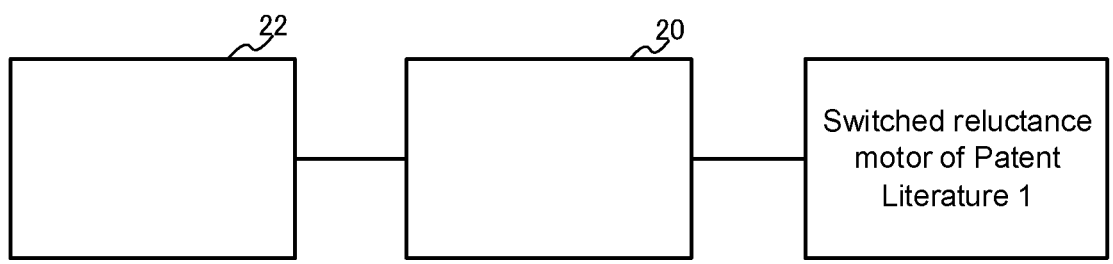

In FIG. 15, FIG. 15[A] is a block diagram illustrating the interconnection-composite-type motor system of the present embodiment, FIG. 15[B] a block diagram illustrating the direct current linear motor system described in the Non-patent Literatures 1 and 2, and FIG. 15[C] a block diagram illustrating the switched reluctance motor system described in the Patent Literature 1. A two-quadrant constant current control circuit represented by the first block and an FF switch circuit represented by the second block are common to the three motor systems. The point of differentiation of the three motor systems lies in a motor part represented by the third block.

Differentiation between FIG. 15[A] and FIG. 15[B] will be described.

The source of torque of the motor in FIG. 15[A] is the attraction force of the coils wound around the tooth-groove iron cores, while the source of torque of the motor in FIG. 15[B] is the Fleming's force between the external magnetic field and the coil current. These motors are different from each other in principle of torque generation and inevitably in development elements for better performance.

The attraction force in FIG. 15[A] is proportional to the square of the coil current. Thus, development in FIG. 15[A] is mainly structural development for satisfying contradictory targets of dividing coil for easy switching of the coil current and of unifying [AT] of a plurality of coils for increasing the attraction force. The combination of the tooth-groove iron cores and the overlapping coils is a part of it.

The Fleming's force in FIG. 15[B] is directly proportional to the current. Thus, existence itself of a plurality of coils [AT] is satisfactory. It is not necessary to use an iron core for interconnecting coils, and thus air-core coils are FFP-molded.

Differentiation between the motors in FIGS. 15[A] and 15[C] will be described. The point of the invention of FIG.

15[C] lies in dividing of coil together with iron core under constant coil [AT] for improvement in decrease of the reactance of coil and easiness of switching of coil current. Although this have the intended effects, it is found that an amount of conductor used for coils increases significantly and, in proportion to this, the coil weight increases and resistance loss is generated. According to the motor of the present embodiment illustrated in FIG. 15[A], the new composition of interconnection and composite structure provides large effects of further improvement in easiness of switching of coil current and increase in the torque weight ratio approximately in one digit.

The interconnection-composite-type motor of the present invention is an innovative attraction motor having two features i.e. interconnection and composite structure, and heretofore an in-wheel motor for an electric vehicle has been described as the first embodiment. However, the motor of the present invention can exhibit its innovativeness in other fields than in-wheel motor. In that case, however, it is considered that it is better to change slightly the motor structure of the present invention.

Figure 16:
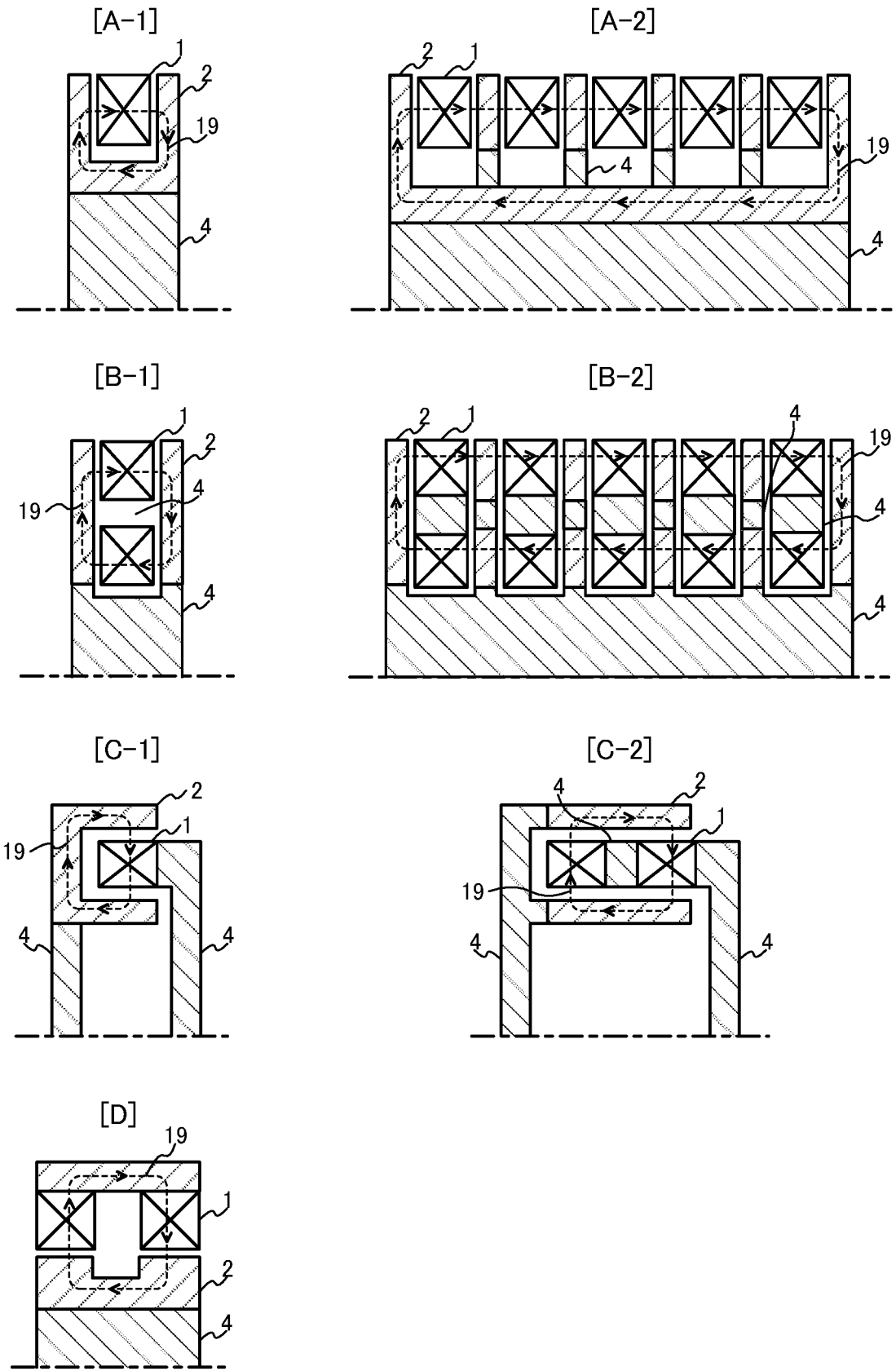
FIG. 16 illustrates a second embodiment of the present invention.

FIG. 16 illustrates a second embodiment from this point of view. This figure illustrates an upper half of cross-section including the center line taken in a direction vertical to the rotating direction. The reference numeral 1 denotes a stator formed by combining a ring-shaped tooth-groove iron core, which is provided with interconnected coils, and a non-magnetic lightweight member 4. The reference numeral 2 denotes a rotor formed by combining an attraction pole having opposed surfaces at both ends and a non-magnetic lightweight member. And, the reference numeral 19 denotes a circulation path of magnetic flux, which is disposed in the circumferential direction at intervals of two magnetic poles.

FIG. 16[A-2] illustrates an axle-type attraction motor that is long in the axial direction, FIG. 16[B-1] the above-described first embodiment, FIG. 16[B-2] a small lightweight large capacity gearless wind power generator, and FIGS. 16[C-1] and 16[C-2]quick-release motor structure. FIGS. [A-1], [C-1] and [D] illustrate general-purpose attraction motor structures.

Further, these are also embodiments of linear motor, having the structures illustrated in the figures in cross-section takin along the traveling direction. In particular, the linear motor illustrated in FIG. 16[B-2] is small and can give a propulsion/weight ratio that is near to double-digit increase in comparison with conventionally-considerable ratio. Thus, it can be expected to realize innovation application firstly to linear-motor-driven ultrahigh-speed elevator for skyscraper building, and to other application such as catapult drive control, seismic isolation structure of large building, and electromagnetic damper, for example.

INDUSTRIAL AVAILABILITY

The present invention can widely applied for realizing a high efficiency motor without using rare earth in various mechanisms that include a motor.

As application examples of a gearless motor, it is possible to mention:
    in-wheel motor for electric vehicle,
    in-wheel motor for fuel cell electric vehicle,
    large capacity gearless wind power generator,
    gearless motor for elevator,
    motor for forklift's lifting device, and
    axle-type motor for railway vehicle.

As application examples of a linear motor, it is possible to mention:
    linear motor elevator for skyscraper building,
    propulsion braking linear motor for catapult
    seismic isolation mechanism for building, and
    electromagnetic damper.

And, as an example of a general-purpose motor, it is possible to mention a motor for air conditioner heat pump.

REFERENCE SIGNS LIST

1: stator;
    2: rotor;
    3: air-cooling duct;
    4: lightweight reinforcing member;
    5: support shaft;
    6: air gap;
    7: angular position detector;
    7': angle input shaft;
    8: conical bearing;
    9: wheel;
    10: brake disk;
    11: brake shoe;
    12: mounting plate;
    13: tire;
    14: large ring-shaped tooth-groove iron core;
    14': small ring-shaped tooth-groove iron core;
    14-1-14-K, 14-1'-14-K': tooth iron core;
    15-1-15-K, 15-1'-15-K': groove;
    16-1, 16-2, 16-3, . . . : coil;
    16-1A-16-6A: coil;
    16-1B-16-6B: coil;
    17-1-17-8, 17-1'-17-8': attraction pole;
    18: moving direction arrow
    19: magnetic path;
    20: FF switch;
    20-1A-20-6A: FF switch;
    20-1B-20-6B: FF switch;
    21: iron core support member;
    22: two-quadrant constant current poser source;
    23: commutating capacitor;
    24-1, 24-2, 24-3, 24-4: diode; and
    25: commutation reactor.

The invention claimed is:

1. An interconnection-composite-type motor, comprising:
    a stator, in which a rectangular-cross-section dual-ring tooth-groove iron core has tooth iron cores, which each penetrate to both side surfaces and are finished on both side surfaces, and grooves for receiving coils wound on both the side surfaces, with the tooth iron cores and the grooves being arranged alternately in circumferential direction; and the dual-ring tooth-groove iron core receives and mechanistically holds coils of a first overlapping phase, coils of a second overlapping phase, coils of a third overlapping phase, coils of a fourth overlapping phase, . . . in such a way that A-phase coils and B-phase coils of the first overlapping phase in commutating relation to each other alternately at intervals of one magnetic pole length with the coils of the same phase being connected in series, the coils of the second overlapping phase in a same arrangement as the coils of the first overlapping phase are shifted as a whole by the one magnetic pole length divided by a number of overlapping phases, the coils of the third overlapping phase, the coils of the fourth overlapping phase, . . . are shifted sequentially and progressively in such a way that the coils of the predetermined number of overlapping phases overlap each other and are interconnected so that coils' magnetomotive forces are unified in direction in one ring-shaped tooth-groove iron core and coils' magnetomotive forces are unified in reverse direction in the other ring-shaped tooth-groove iron core, a rotor, in which: composite structures are provided at intervals of two magnetic pole length in the circumferential direction of the ring-shaped tooth-groove iron cores, with each composite structure being formed so that attraction poles each having, at both ends, opposed surfaces of the one magnetic pole length in width are opposed on both sides at a same angular position to form a circulation magnetic path that connects large and small ring-shaped tooth-groove iron cores via an air gap and to form air-gap surfaces at four places; and the attraction poles as a whole are mechanistically held so that the rotor can rotate around the stator;

a two-quadrant constant current control circuit, which by itself performs control so as to output, in a constant direction, constant direct current of a value set with respect to load electromotive force that changes variously in a two-quadrant area for input from an alternating current; and a flip-flop circuit, in which overlapping circuits of the predetermined number of overlapping phases are connected in series in such a way that a flip-flop switch of a first overlapping circuit routes a supply current from the two-quadrant constant current control circuit alternately to either one of an A-phase coil and a B-phase coil of the stator depending on a signal from an angular position detector, and the routed circuit is converged again to supply the current to a flip-flop switch of a second overlapping circuit, and this is repeated for a third overlapping circuit, a fourth overlapping circuit, . . . to the number of the overlapping phases.

2. An interconnection-composite-type motor, comprising:

a stator, which comprises a plurality of ring-shaped tooth-groove iron cores that are provided with magnetic poles on both surfaces or one surface and receive coils parallel to magnetic pole surfaces or surface, with the coils being multiplexed based on two-phase coils made up of A-phase coils and B-phase coils as commutation partners so as to divide a coil ampere-turn in such a way that coils overlapping each other are shifted in phase angle by $\pi$/(number of overlapping phases), the overlapping parts are interconnected, and magnetomotive forces in each iron core are unified in direction so that magnetic flux circulates in one direction; and a rotor, which holds attraction poles as a whole in such a way that composite mechanisms are provided at intervals of two magnetic pole length in a rotating direction, with each composite mechanism having attraction poles each having opposed surfaces of one magnetic pole length at both ends or on both surfaces, which are opposed to the ring-shaped tooth-groove iron cores via an air gap so that a magnetic path circulating at right angle to the rotating direction is formed and a plurality of air-gap surfaces are formed;

wherein the interconnection-composite-type motor utilizes an attraction force in the rotating direction or in the reverse direction or electric power recovered by a two-quadrant constant current control circuit, with the attraction force being generated in the attraction poles by positioning a leading edge or a trailing edge of each attraction pole at a position on which magnetomotive force of each overlapping coil concentrates by supplying constant current from the two-quadrant constant current control circuit to each overlapping coil at a phase difference of $\pi$/(number of overlapping phases) in turn while switching the constant current from the two-quadrant constant current control circuit to the A-phase coils or to the B-phase coils.

3. An interconnection-composite-type generator, comprising:

a stator, which comprises a plurality of ring-shaped tooth-groove iron cores that are provided with magnetic poles on both surfaces or one surface and receive coils parallel to magnetic pole surfaces or surface, with the coils being multiplexed based on two-phase coils made up of A-phase coils and B-phase coils as commutation partners so as to divide a coil ampere-turn in such a way that coils overlapping each other are shifted in phase angle by $\pi$/(number of overlapping phases), the overlapping parts are interconnected, and magnetomotive forces in each iron core are unified in direction so that magnetic flux circulates in one direction; and a rotor, which holds attraction poles as a whole in such a way that composite mechanisms are provided at intervals of two magnetic pole length in a rotating direction, with each composite mechanism having attraction poles each having opposed surfaces of one magnetic pole length at both ends or on both surfaces, which are opposed to the ring-shaped tooth-groove iron cores via an air gap so that a magnetic path circulating at right angle to the rotating direction is formed and a plurality of air-gap surfaces are formed;

wherein the interconnection-composite-type generator utilizes an attraction force in the rotating direction or in the reverse direction or electric power recovered by a two-quadrant constant current control circuit, with the attraction force being generated in the attraction poles by positioning a leading edge or a trailing edge of each attraction pole at a position on which magnetomotive force of each overlapping coil concentrates by supplying constant current from the two-quadrant constant current control circuit to each overlapping coil at a phase difference of $\pi$/(number of overlapping phases) in turn while switching the constant current from the two-quadrant constant current control circuit to the A-phase coils or to the B-phase coils.

4. An interconnection-composite-type linear motor, wherein the stator is made linear in claim 2.

* * * * *